(12) United States Patent
Hu et al.

(10) Patent No.: US 12,160,383 B2
(45) Date of Patent: Dec. 3, 2024

(54) EHT-STF TRANSMISSION FOR DISTRIBUTED-TONE RESOURCE UNITS IN 6GHZ LOW-POWER INDOOR SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Gary A. Anwyl, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 352 days.

(21) Appl. No.: 17/670,209

(22) Filed: Feb. 11, 2022

(65) Prior Publication Data
US 2022/0263636 A1    Aug. 18, 2022

Related U.S. Application Data

(60) Provisional application No. 63/252,636, filed on Oct. 6, 2021, provisional application No. 63/233,354, filed
(Continued)

(51) Int. Cl.
| | |
|---|---|
| H04L 5/00 | (2006.01) |
| H04L 27/26 | (2006.01) |
| H04W 72/0453 | (2023.01) |

(52) U.S. Cl.
CPC ............ *H04L 5/0048* (2013.01); *H04L 5/001* (2013.01); *H04L 27/26025* (2021.01); *H04W 72/0453* (2013.01); *H04L 5/0064* (2013.01)

(58) Field of Classification Search
CPC . H04L 5/001; H04L 5/0048; H04L 27/26025; H04W 72/0453
See application file for complete search history.

(56) References Cited

U.S. PATENT DOCUMENTS

| | | |
|---|---|---|
| 2016/0142187 A1 | 5/2016 | Yang et al. |
| 2019/0289612 A1* | 9/2019 | Chen ............... H04L 27/2613 |

(Continued)

FOREIGN PATENT DOCUMENTS

| | | |
|---|---|---|
| CN | 106797278 A | 5/2017 |
| CN | 107113267 A | 8/2017 |

(Continued)

OTHER PUBLICATIONS

China National Intellectual Property Administration, First Office Action in China Patent Application No. 202210140775.3, Apr. 25, 2023.

(Continued)

*Primary Examiner* — Kevin C. Harper
(74) *Attorney, Agent, or Firm* — Andy M. Han; Han IP PLLC

(57) ABSTRACT

Various schemes pertaining to extremely-high-throughput short training field (EHT-STF) transmission for distributed-tone resource units (dRUs) in 6 GHz low-power indoor (LPI) systems are described. A communication entity distributes subcarriers of a RU over an entire physical-layer protocol data unit (PPDU) bandwidth or a frequency subblock of a bandwidth to generate a dRU associated with an EHT-STF of an uplink (UL) trigger-based (TB) PPDU. The communication entity then transmits the dRU associated with the EHT-STF in the entire PPDU bandwidth or a tone range of a regular RU (rRU) corresponding to the frequency subblock.

18 Claims, 17 Drawing Sheets

Related U.S. Application Data on Aug. 16, 2021, provisional application No. 63/150,152, filed on Feb. 17, 2021.

(56) References Cited

U.S. PATENT DOCUMENTS

| | | | |
|---|---|---|---|
| 2020/0014509 A1 | 1/2020 | Asterjadhi et al. | |
| 2021/0006494 A1 | 1/2021 | Yazawa et al. | |
| 2021/0044398 A1 | 2/2021 | Noh et al. | |
| 2021/0392661 A1* | 12/2021 | Cao | H04W 72/0453 |
| 2022/0053475 A1* | 2/2022 | Lim | H04L 43/0876 |
| 2022/0247544 A1* | 8/2022 | Park | H04L 5/0092 |
| 2023/0016370 A1 | 1/2023 | Kim et al. | |
| 2023/0379114 A1* | 11/2023 | Yu | H04L 5/0007 |

FOREIGN PATENT DOCUMENTS

| | | |
|---|---|---|
| CN | 110876200 A | 3/2020 |
| CN | 107113140 B | 8/2020 |
| TW | I577148 B | 4/2017 |
| TW | 201935898 A | 9/2019 |
| WO | WO 2020111638 A1 | 6/2020 |
| WO | WO 2020122523 A1 | 6/2020 |
| WO | WO 2021006494 A1 | 1/2021 |

OTHER PUBLICATIONS

United States Patent & Trademark Office, Office Action for U.S. Appl. No. 17/671,567, filed Jan. 30, 2023.

European Patent Office, European Search Report for European Patent Application No. 22156818.1, Jun. 23, 2022.

Taiwan Intellectual Property Office, Office Action for Taiwan Patent Application No. 111105595, Jul. 27, 2022.

Liu et al.; "EHT LTF Sequence"; IEEE 802.11-20/1495r0; [https://mentor.ieee.org/802.11/dcn/20/11-20-1495-00-00be-pdt-of-eht-ltf-sequences.docx]; Sep. 15, 2020.

European Patent Office, Extended European Search Report for European Patent Application No. 22156940.3, Jul. 13, 2022.

Taiwan Intellectual Property Office, Office Action for Taiwan Patent Application No. 111103230, Jul. 26, 2022.

Edward Au (Huawei); "Specification Framework for TGbe", vol. 802.11 EHT; 802.11be, No. 14, (Sep. 5, 2020), IEEE, Sep. 5, 2020, [https://mentor.ieee.org/802.11/dcn/19/11-19-1262-14-00be-specification-framework-for-tgbe.docx].

European Patent Office, European Search Report for European Patent Application No. 22153682.4, Jun. 27, 2022.

\* cited by examiner $$r_{EHT-STF,r,u}^{(i_{seg},i_{TX})}(t) = \frac{1}{\sqrt{|K_r^{EHT-STF}| N_{SS,r,total}}} w_{EHT-STF-T}(t)$$

$$\sum_{k \in (K_r)_m = 1}^{N_{SS,r,u}} \sum \left( [Q_{k,u}^{(i_{seg})}]_{i_{TX},m} EHTS_k \cdot \exp(j2\pi \Delta_{F,EHT}(t - T_{CS,EHT}(M_{r,u} + m))) \right)$$

$KR = \{Ks1:KE1, Ks2:KE2\}$
$KS1, KE1, KS2, KE2$ ARE DEFINED PER DRU OR PER DISTRIBUTION BW OR PER DRU SUBBLOCK SIZE

FIG. 10

| Frequency Subblock Size | BW80 | BW160 | BW320 |
|---|---|---|---|
| 20MHz | [-380,-133,132,379] | [-892,-645,-380,-133,132,379,644,891] | [-1916,-1669,-1404,-1157,-892,-645,-380,-133,132,379,644,891,1156,1403,1668,1915] |
| 40MHz | [-256,256] | [-768,-256,256,768] | [-1792,-1280,-768,-256,256,768,1280,1792] |
| 80MHz | 0 | [-512,512] | [-1536,-512,512,1536] |

FIG. 12

- rRU242/484/996 on BW80

| | RU 1 | RU 2 | RU 3 | RU 4 |
|---|---|---|---|---|
| 242-tone RU | RU 1 (−500: −259) | RU 2 (−253: −12) | RU 3 (12: 253) | RU 4 (259: 500) |
| 484-tone RU | RU 1 (−500: −259; −253: −12) | RU 2 (12: 253; 259: 500) | | |
| 996-tone RU | RU 1 (−500: −3; 3: 500) | | | |

FIG. 13

- rRU242/484/996 on BW160

| 242-tone RU | RU 1<br>[-1012: -771] | RU 2<br>[-765: -524] | RU 3<br>[-500: -259] | RU 4<br>[-253: -12] |
|---|---|---|---|---|
| 484-tone RU | RU 5<br>[12: 253] | RU 6<br>[259: 500] | RU 7<br>[524: 765] | RU 8<br>[771: 1012] |
|  | RU 1<br>[-1012: -771;<br>-765: -524] | RU 2<br>[-500: -259;<br>-253: -12] | RU 3<br>[12: 253;<br>259: 500] | RU 4<br>[524: 765;<br>771: 1012] |
| 996-tone RU | RU 1<br>[-1012: -515;<br>-509: -12] | RU 2<br>[12: 509;<br>515: 1012] | | |

DISTRIBUTING SUBCARRIERS OF A RESOURCE UNIT (RU) OVER AN ENTIRE PHYSICAL-LAYER PROTOCOL DATA UNIT (PPDU) BANDWIDTH OR A FREQUENCY SUBBLOCK OF A BANDWIDTH TO GENERATE A DISTRIBUTED-TONE RU (dRU) ASSOCIATED WITH AN EXTREMELY-HIGH-THROUGHPUT SHORT TRAINING FIELD (EHT-STF) OF AN UPLINK (UL) TRIGGER-BASED (TB) PPDU
1710

TRANSMIT THE DRU ASSOCIATED WITH THE EHT-STF IN THE ENTIRE PPDU BANDWIDTH OR A TONE RANGE OF A REGULAR RU (rRU) CORRESPONDING TO THE FREQUENCY SUBBLOCK
1720

FIG. 17

EHT-STF TRANSMISSION FOR DISTRIBUTED-TONE RESOURCE UNITS IN 6GHZ LOW-POWER INDOOR SYSTEMS

CROSS REFERENCE TO RELATED PATENT APPLICATION

The present disclosure is part of a non-provisional patent application claiming the priority benefit of U.S. Provisional Patent Application Nos. 63/150,152, 63/233,354 and 63/252,636, filed 17 Feb. 2021, 16 Aug. 2021 and 6 Oct. 2021, respectively, the contents of which being incorporated by reference in their entirety.

TECHNICAL FIELD

The present disclosure is generally related to wireless communications and, more particularly, to extremely-high-throughput short training field (EHT-STF) transmission for distributed-tone resource units (dRUs) in 6 GHz low-power indoor (LPI) systems.

BACKGROUND

Unless otherwise indicated herein, approaches described in this section are not prior art to the claims listed below and are not admitted as prior art by inclusion in this section.

There are strict power spectral density (PSD) requirements for LPI in 6 GHz which tend to result in lower power in transmission and short coverage range. One approach to improving coverage range is to distribute small resource unit (RU) tones ("regular RU" or "logical RU") over a wider bandwidth or a large frequency subblock, thereby resulting in interleaved, interlaced or distributed-tone RUs (dRU) to achieve higher transmission power. Unlike regular RUs in which subcarriers are basically continuous or adjacent to one another, the subcarriers in dRUs are spread over a wider bandwidth and hence the tones are separated apart with different distances therebetween. Due to tone separations or non-continuity, the EHT-STF transmission for regular RUs cannot be directly used for EHT-STF transmission for dRUs. Therefore, there is a need for a solution for EHT-STF transmission for dRUs in 6 GHz LPI systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT-STF transmission for dRUs in 6 GHz LPI systems. It is believed that implementations of the proposed schemes may address or otherwise alleviate aforementioned issues.

In one aspect, a method may involve distributing subcarriers of a RU over an entire physical-layer protocol data unit (PPDU)bandwidth or a frequency subblock of a bandwidth to generate a dRU associated with an EHT-STF of an uplink (UL) trigger-based (TB) PPDU. The method may also involve transmitting the dRU associated with the EHT-STF in the entire PPDU bandwidth or a tone range of a regular RU (rRU) corresponding to the frequency subblock.

In another aspect, an apparatus may include a transceiver and a processor coupled to the transceiver. The transceiver may be configured to transmit and receive wirelessly. The processor may be configured to distribute subcarriers of a RU over an entire PPDU bandwidth or a frequency subblock of a bandwidth to generate a dRU associated with an EHT-STF of an UL TB PPDU. The processor may be also configured to transmit, via the transceiver, the dRU associated with the EHT-STF in the entire PPDU bandwidth or a tone range of a rRU corresponding to the frequency subblock.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 10 is a diagram of an example scenario in accordance with an implementation of the present disclosure.

FIG. 12 is a diagram of an example scenario in accordance with an implementation of the present disclosure.

FIG. 13 is a diagram of an example scenario in accordance with an implementation of the present disclosure.

FIG. 14 is a diagram of an example scenario in accordance with an implementation of the present disclosure.

FIG. 17 is a flowchart of an example process in accordance with an implementation of the present disclosure.

DETAILED DESCRIPTION OF PREFERRED EMBODIMENTS

Figure 1:
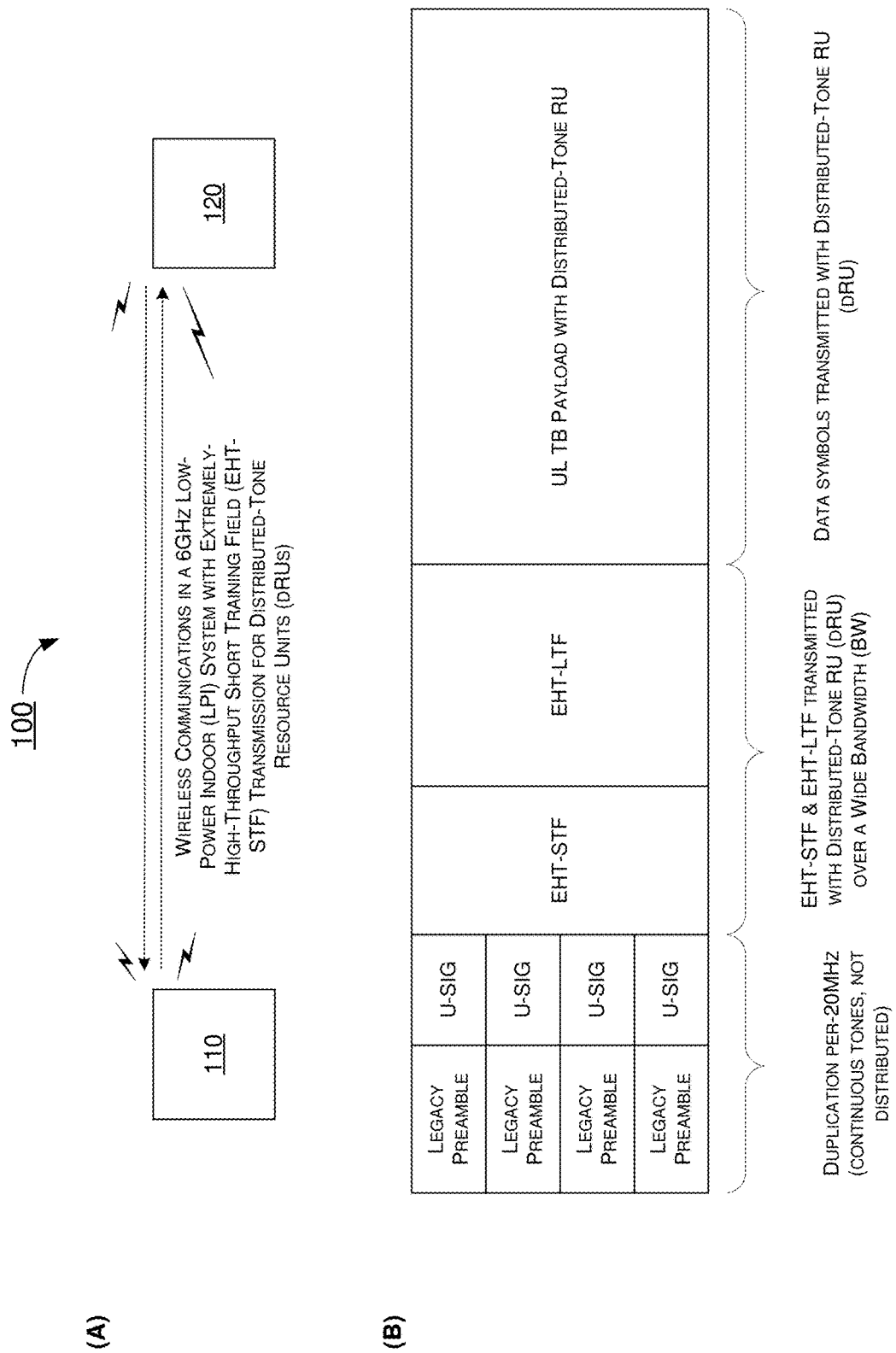
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EHT-STF transmission for dRUs in 6 GHz LPI systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular MRU may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on.

Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320. It is further noteworthy that, in the present disclosure, a 26-tone interleaved-tone (or interlaced-tone) RU may be interchangeably denoted as iRU26, a 52-tone interleaved-tone (or interlaced-tone) RU may be interchangeably denoted as iRU52, a 106-tone interleaved-tone (or interlaced-tone) RU may be interchangeably denoted as iRU106, a 242-tone interleaved-tone (or interlaced-tone) RU may be interchangeably denoted as iRU242, and a 484-tone interleaved-tone (or interlaced-tone) RU may be interchangeably denoted as iRU484.

FIG. 1 illustrates an example network environment 100 in which various solutions and schemes in accordance with the present disclosure may be implemented. FIG. 2-FIG. 17 illustrate examples of implementation of various proposed schemes in network environment 100 in accordance with the present disclosure. The following description of various proposed schemes is provided with reference to FIG. 1-FIG. 17.

Referring to part (A) of FIG. 1, network environment 100 may involve a communication entity 110 and a communication entity 120 communicating wirelessly (e.g., in a WLAN in accordance with one or more IEEE 802.11 standards). For instance, communication entity 110 may be a first station (STA) and communication entity 120 may be a second STA, with each of the first STA and second STA functioning as either an access point (AP) STA or a non-AP STA. Under various proposed schemes in accordance with the present disclosure, communication entity 110 and communication entity 120 may be configured to communicate wirelessly with EHT-STF transmission for dRUs in 6 GHz LPI systems, as described herein.

Referring to part (B) of FIG. 1, an UL TB PPDU transmitted by UE 110 under various proposed schemes in accordance with the present disclosure may include legacy preamble(s), universal signal (U-SIG) field(s), an EHT-STF, an EHT long training field (EHT-LTF), and a payload (e.g., data). The legacy preamble(s) and U-SIG field(s) may be transmitted per 20 MHz (e.g., continuous/adjacent tones that are not distributed or otherwise interleaved) and may be duplicated for each 20 MHz segment or frequency subblock. On the other hand, each of the EHT-STF, EHT-LTF and payload may be transmitted with dRUs. More specifically, under various proposed schemes described below, the EHT-STF may be transmitted with a dRU over an entirety of a wide bandwidth (e.g., 80 MHz, 160 MHz or 320 MHz).

Generally, EHT-STF serves the purposes of power measurement for automatic gain control (AGC) and auto-detection of EHT-STF based on its periodic repetitions. For an UL TB PPDU with regular RU(s), the EHT-STF is typically transmitted with the same subcarrier indices (herein interchangeably referred to as "tone index or tone indices") as the assigned RU. To achieve better power measurement and perform for both large RUs (e.g., wider bandwidth) and small RUs (e.g., narrow bandwidth), 8 µs EHT-STF (e.g., one STF tone in every eight tones) is used for UL TB PPDU transmissions with a 1.6 µs periodicity (hence repetition of five times in 8 µs). The 8 µs EHT-STF has 8× downsampling in frequency domain. Unlike the regular RUs, subcarriers in dRUs are not continuous or adjacent with one another, and thus EHT-STF cannot be transmitted directly with the same subcarrier indices as that of the dRU. Instead, EHT-STF transmission is defined with the specific segments or subblocks or portions or entire bandwidth (BW) in frequency domain according to various proposed schemes herein. Further, since the tones of dRUs are spread over a wider bandwidth, 4 µs EHT-STF may also be used for UL TB PPDU transmissions with dRUs. The 4 µs EHT-STF has 16× down-sampling in frequency domain. Moreover, the EHT-STF sequence (both 4 µs EHT-STF and 8 µs EHT-STF) may be reused for dRU transmissions.

Figure 2:
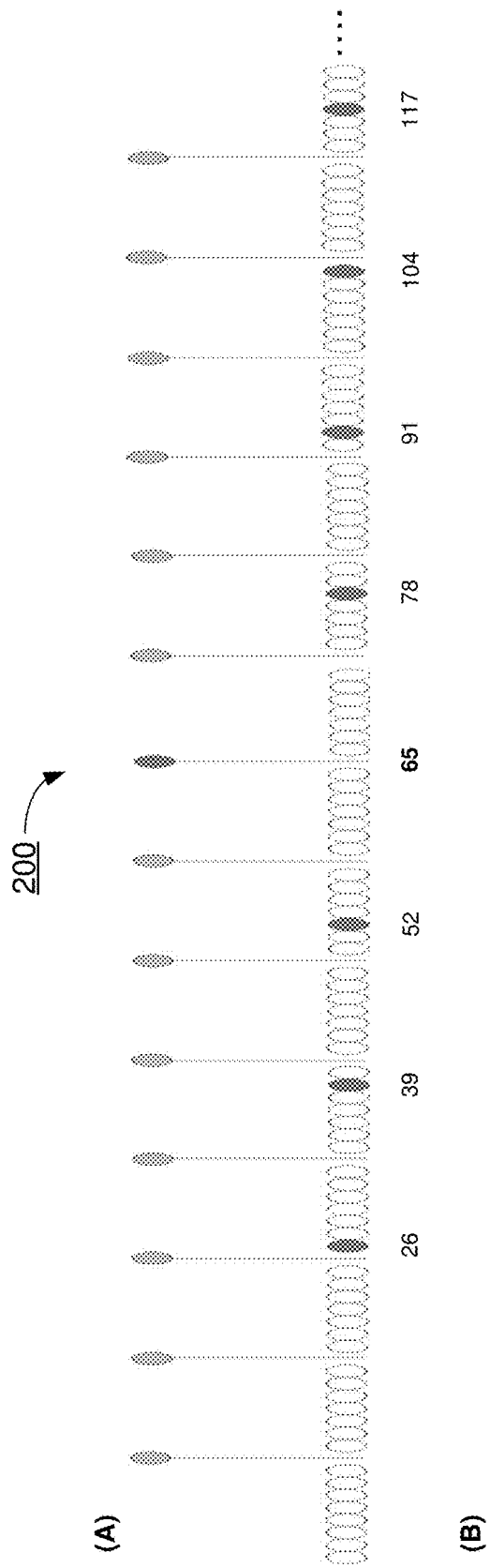
FIG. 2 is a diagram of an example scenario in accordance with an implementation of the present disclosure.

FIG. 2 illustrates an example scenario 200 under a first proposed scheme in accordance with the present disclosure. Under the first proposed scheme, EHT-STF transmission may be performed based on distributed tone index. Referring to the example shown in part (A) of FIG. 2, distributed tone index for a first RU26 over BW80 (using global Dtd method) may be [26 39 52 65 78 91 104 117 130 143 156 169 182 195 208 221 234 247 260 273 286 299 312 325 338 351]. In this example, only three EHT-STF tones (i.e., 65, 169, 273) are transmitted in case the same approach as for a regular RU is followed by using a distributed tone index. Note that the first or starting tone index in this example is "1" instead of "0". Referring to part (B) of FIG. 2, similar to transmissions for regular RUs, EHT-STF transmissions for dRUs may be based on a set Kr of tone index of dRUs. Under this proposed scheme, the same frequency domain sequence of EHT-STF for TB PPDUs may be reused.

Figure 3:
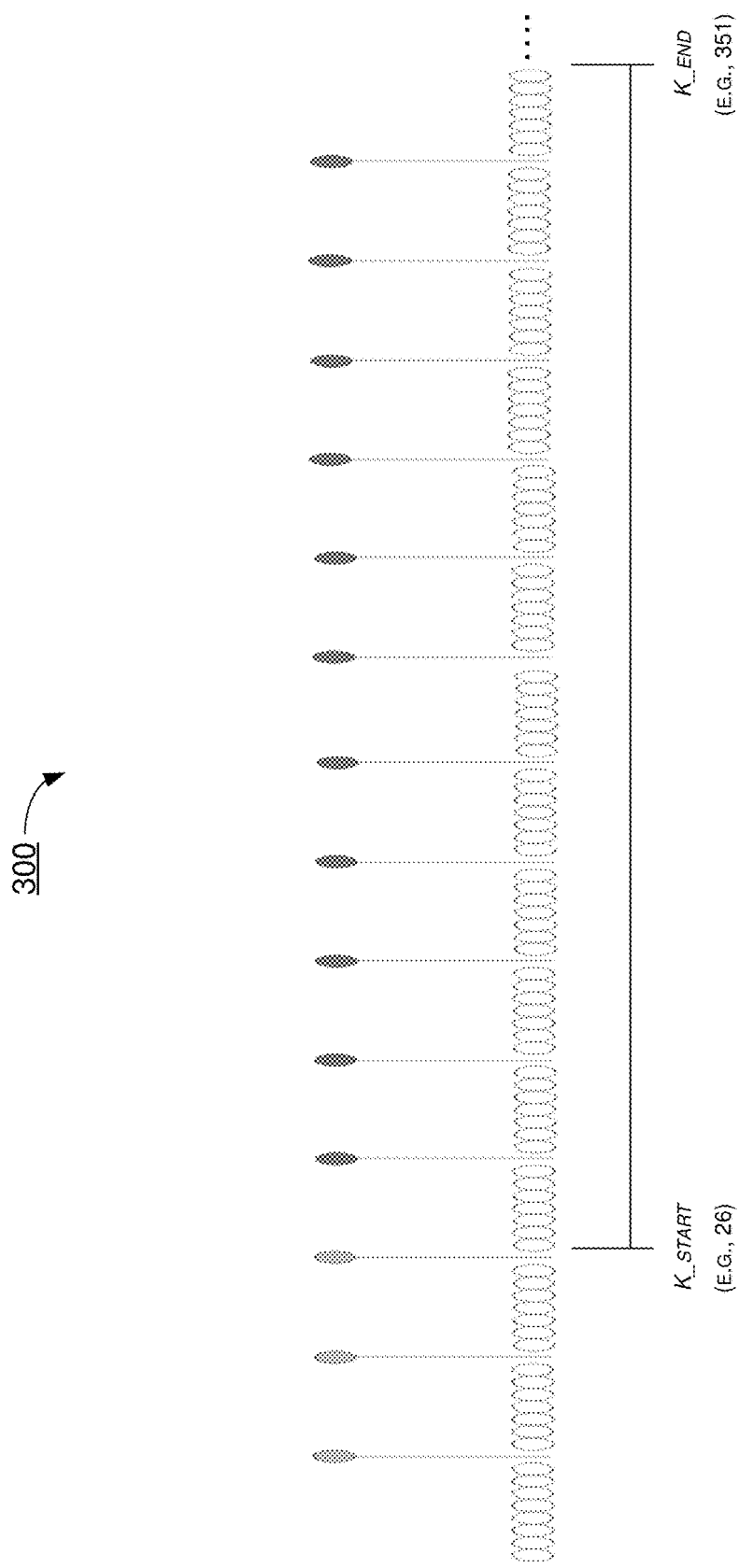
FIG. 3 is a diagram of an example scenario in accordance with an implementation of the present disclosure.

FIG. 3 illustrates an example scenario 300 under a second proposed scheme in accordance with the present disclosure. Under the second proposed scheme, EHT-STF transmission may be based on a tone range or frequency range. That is, EHT-STF transmissions may be based on the frequency range defined by K_start:K_end, where K_start denotes the starting (or first) subcarrier index of dRU and K_end denotes the ending (or last) subcarrier index of dRU. In the example shown in FIG. 3, the range is [26:351] with K_start=26 and K_end=351.

Figure 4:
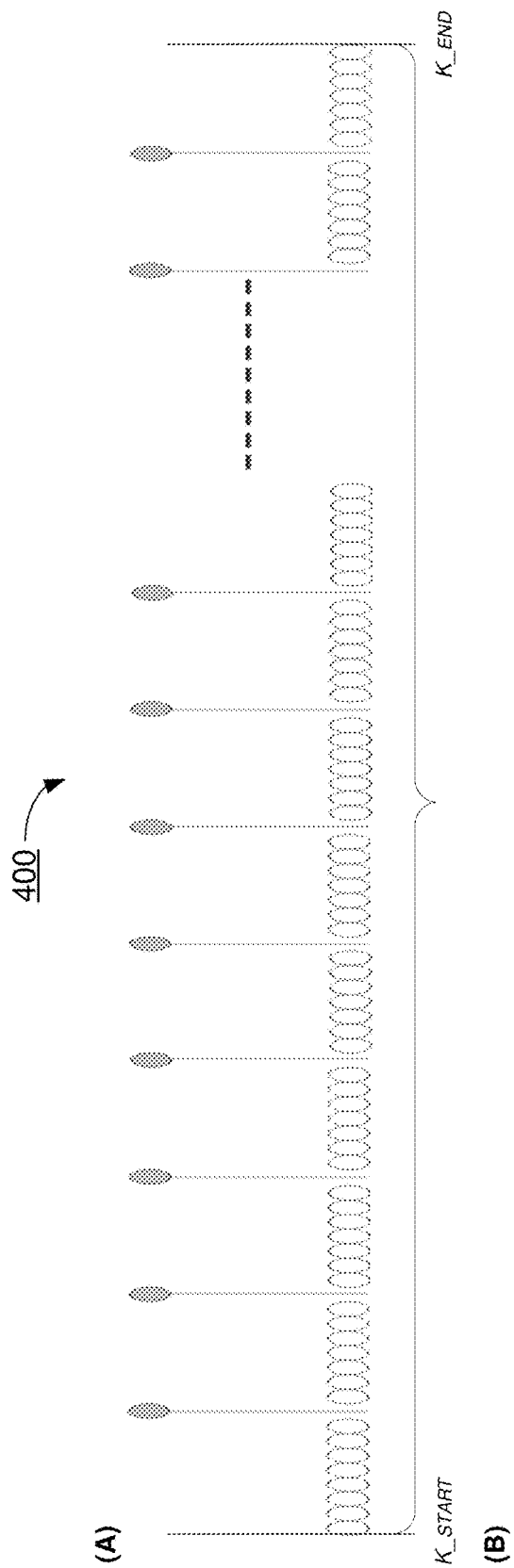
FIG. 4 is a diagram of an example scenario in accordance with an implementation of the present disclosure.

FIG. 4 illustrates an example scenario 400 under an implementation of the second proposed scheme. Under this implementation of the second proposed scheme, EHT-STF transmission may be performed in a frequency range defined by K_start:K_end. Referring to part (A) of FIG. 4, the dRU may be distributed or otherwise spread over an entirety of the frequency range. Referring to part (B) of FIG. 4, under this implementation of the second proposed scheme, EHT-STF may not be transmitted directly using the tone indices of dRU. Instead, in this implementation of the second proposed scheme, EHT-STF transmission may be defined in a segment or a frequency range as a transmission tone range Kr=[K_start:K_end].

Figure 5:
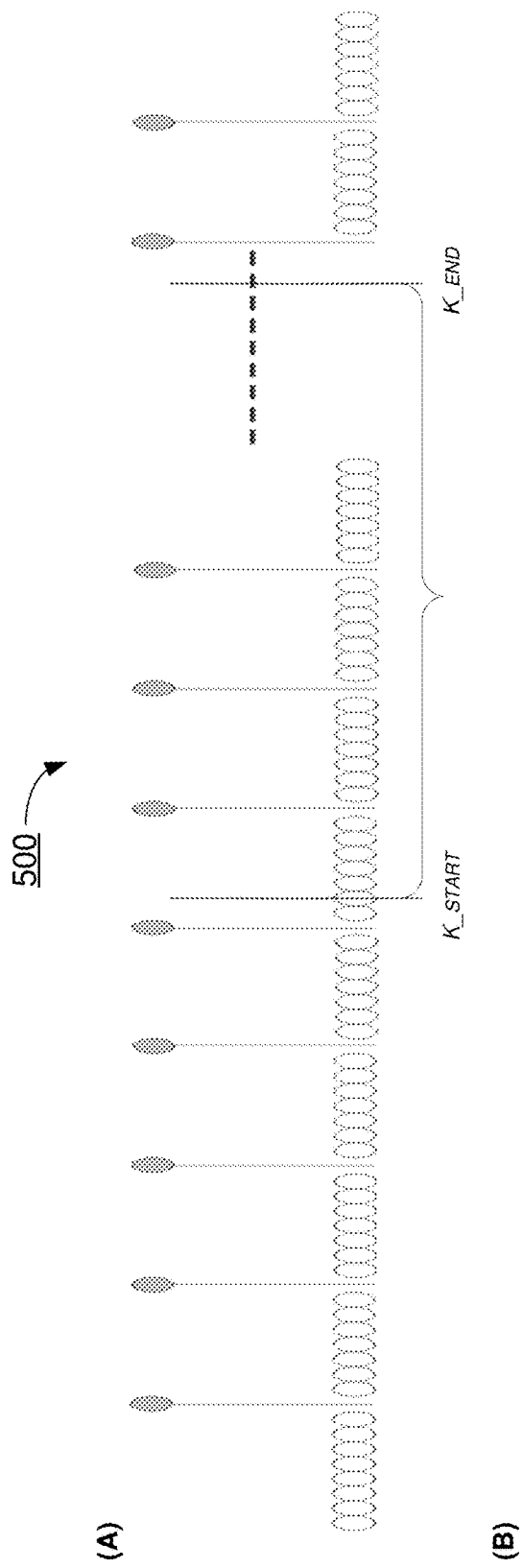
FIG. 5 is a diagram of an example scenario in accordance with an implementation of the present disclosure.

FIG. 5 illustrates an example scenario 500 under another implementation of the second proposed scheme. Under this implementation of the second proposed scheme, EHT-STF transmission may be performed in a frequency segment, from K_start to K_end, which is a portion (and not an entirety) of a given frequency range. Referring to part (A) of FIG. 5, the dRU may be distributed or otherwise spread over the frequency segment but not an entirety of the frequency range. Referring to part (B) of FIG. 5, under this implementation of the second proposed scheme, EHT-STF may be defined in a frequency segment or a frequency subblock (within a frequency range) as a transmission tone range Kr=K_start:K_end.

Figure 6:
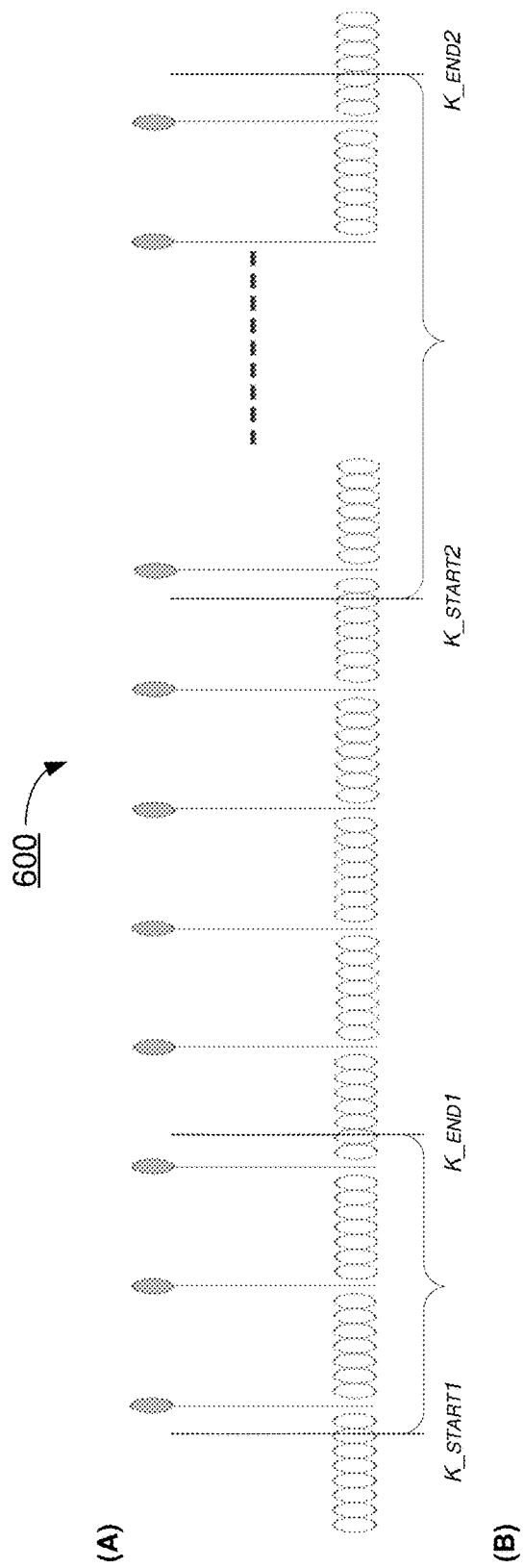
FIG. 6 is a diagram of an example scenario in accordance with an implementation of the present disclosure.

FIG. 6 illustrates an example scenario 600 under yet another implementation of the second proposed scheme. Under this implementation of the second proposed scheme, EHT-STF transmission may be performed in more than one frequency segment, such as from K_start1 to K_end1 and from K_start2 to K_end2, which are portions (and not an entirety) of a given frequency range. Referring to part (A) of FIG. 6, the dRU may be distributed or otherwise spread over the multiple frequency segments but not an entirety of the frequency range. Referring to part (B) of FIG. 6, under this implementation of the second proposed scheme, EHT-STF may be defined in a frequency segment or a frequency subblock (within a frequency range) as a transmission tone range Kr=K_start1:K_end1, K_start2:K_end2.

Figure 7:
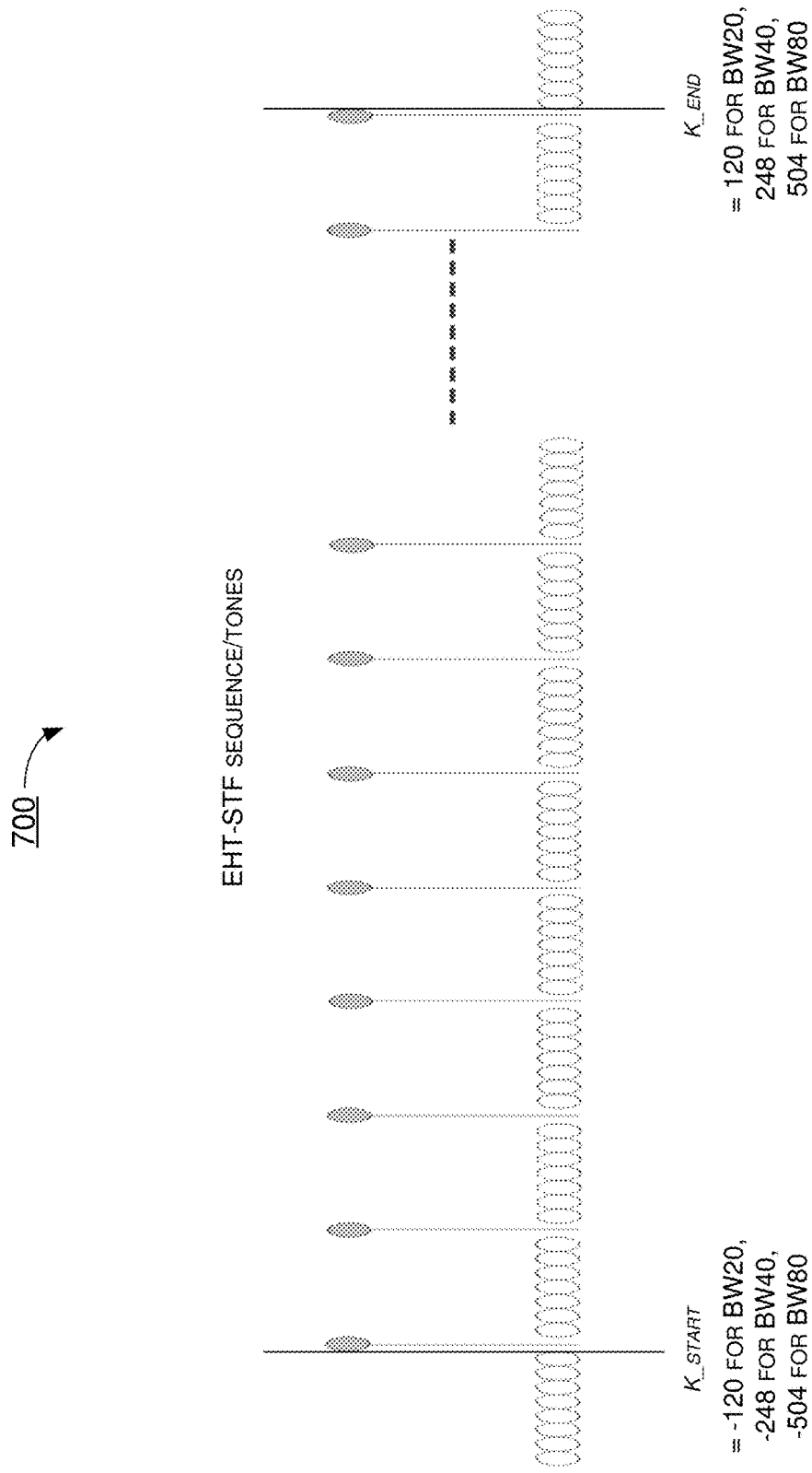
FIG. 7 is a diagram of an example scenario in accordance with an implementation of the present disclosure.

FIG. 7 illustrates an example scenario 700 under a third proposed scheme in accordance with the present disclosure. Under the third proposed scheme in accordance with the present disclosure, the tones of each size of dRU may be distributed over an entire bandwidth. Referring to FIG. 7, under the third proposed scheme, EHT-STF transmission may be performed over the same entire bandwidth or frequency segment (e.g., an 80 MHz segment) as data portion of dRU transmission. In the example shown in FIG. 7, K_start may be −120 for BW20, −248 for BW40 or −504 for BW80. Similarly, K_end may be 120 for BW20, 248 for BW40 or 504 for BW80.

Figure 8:
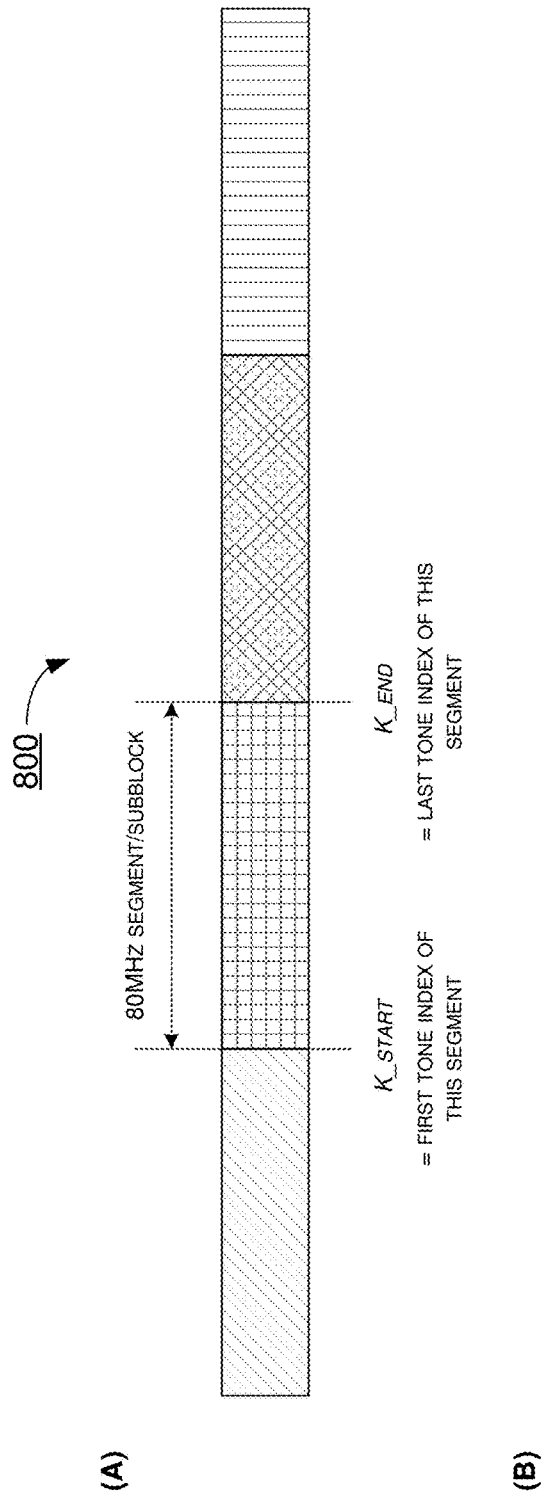
FIG. 8 is a diagram of an example scenario in accordance with an implementation of the present disclosure.

FIG. 8 illustrates an example scenario 800 under the third proposed scheme. Under the third proposed scheme, EHT-STF transmission may be performed for a dRU over a given frequency segment (e.g., an 80 MHz, 160 MHz or 320 MHz frequency segment), from K_start to K_end, which is a portion (and not an entirety) of a given frequency range. Referring to part (A) of FIG. 8, the dRU may be distributed or otherwise spread over the frequency segment but not an entirety of the frequency range. Referring to part (B) of FIG. 8, under this proposed scheme, EHT-STF may be defined in a frequency segment as a transmission tone range Kr=K_start:K_end.

Under various proposed schemes in accordance with the present disclosure, the existing EHT-STF sequence for dRU transmission may be re-used, with the 1.6 µs periodicity, five repetitions and total 8 µs EHT-STF duration for transmission of UL TB PPDU with dRU. In the context of the second proposed scheme, dRU EHT-STF transmissions may be performed based on each dRU frequency range or segment. For instance, the range may be defined as a transmission tone range Kr=[Ks1:Ke1, Ks2:Ke2], where Ks1 and Ks2 denote the first dRU tone index in lower and upper (or left and right) parts, respectively, and Ke1 and Ke2 denote the last dRU tone index in the lower and upper (or left and right) parts, respectively. Here, Kr is per dRU (e.g., Kr varies from one dRU to another dRU).

Figure 9:
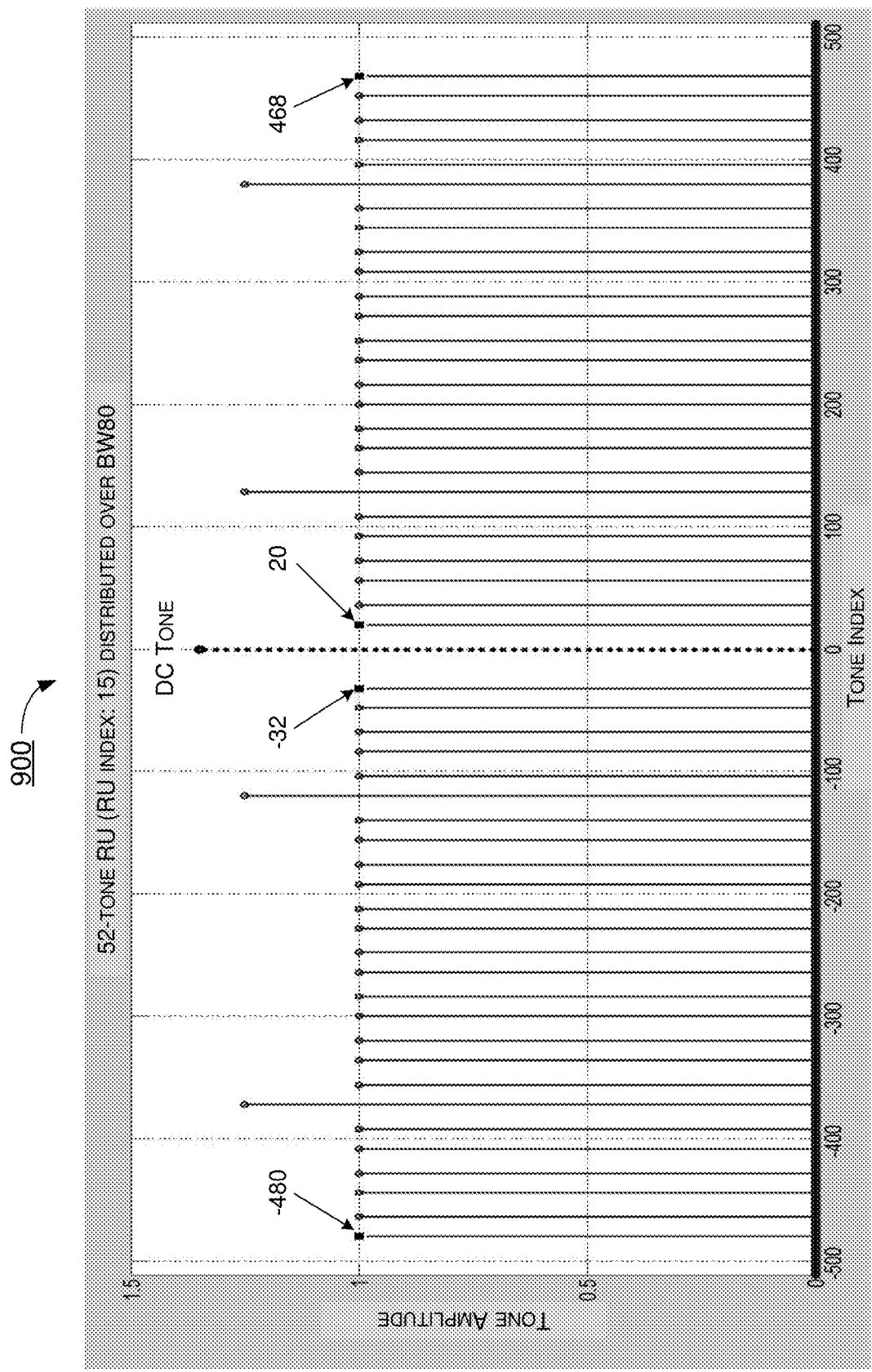
FIG. 9 is a diagram of an example scenario in accordance with an implementation of the present disclosure.

FIG. 9 illustrates an example scenario 900 under the second proposed scheme in accordance with the present disclosure. In the example shown in FIG. 9, for a 52-tone RU (with RU index 15) distributed over BW80 ("dRU52_15"), Ks1=−480, Ke1=−32, Ks2=20, Ke2=468. FIG. 10 illustrates an example scenario 1000 of how EHT-STF may be defined in a frequency segment (within a frequency range) as a transmission tone range Kr={Ks1:Ke1, Ks2:Ke2}, with each of Ks1, Ke1, Ks2, Ke2 being defined per dRU.

Figure 11:
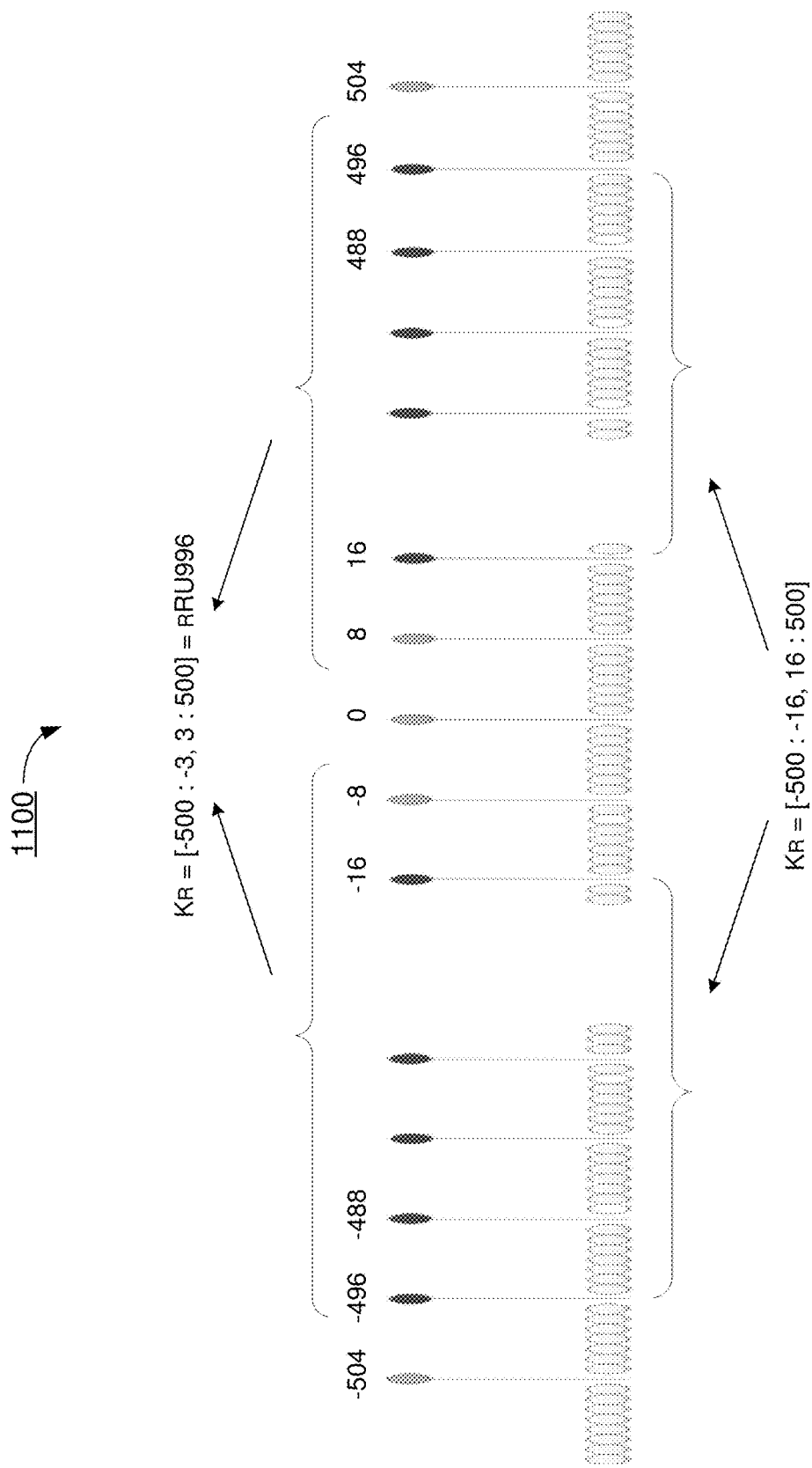
FIG. 11 is a diagram of an example scenario in accordance with an implementation of the present disclosure.

Under the third proposed scheme, dRU EHT-STF transmissions may be performed based on each distribution bandwidth or distribution frequency subblock. That is, the EHT-STF transmission range may be defined as a transmission tone range Kr=[Ks1:Ke1, Ks2:Ke2]. However, instead of being defined per dRU, Ks1, Ke1, Ks2, Ke2 are defined per distribution bandwidth. Thus, all the dRUs on the same distribution bandwidth or same frequency subblock may use the same Kr and transmit the same EHT-STF sequence. For instance, for all dRUs transmitted on BW20, EHT-STF transmission range may be defined as a transmission tone range Kr=[−120:−2, 2:120] which may be equivalent to Kr=rRU242. For all dRUs transmitted on BW40, EHT-STF transmission range may be defined as a transmission tone range Kr=[−244:−3, 3:244] which may be equivalent to Kr=rRU484. For all dRUs transmitted on BW80, EHT-STF transmission range may be defined as a transmission tone range Kr=[−500:−16, 16:500] (such that 122 EHT-STF tones are transmitted) or, alternatively, may be defined as a transmission tone range Kr=[−500:−3, 3:500] which may be equivalent to Kr=rRU996 (such that 124 EHT-STF tones are transmitted for about 0.07 dB more power). FIG. 11 illustrates an example scenario 1100 of an EHT-STF transmission range for all dRUs transmitted on BW80. In the example shown in FIG. 11, the dRU tone range on BW80 is [−499:−16, 17:500].

In one approach under the third proposed scheme, for dRU operations on a hybrid or puncture mode with dRU transmission on a frequency subblock of a wide bandwidth (e.g., 80 MHz or greater), the EHT-STF transmission tone range Kr may be calculated by adding a constant shift as: Kr+$K_{shift}$(i), where i denotes the frequency subblock index on a wide bandwidth, and $K_{shift}$ is defined in a table shown in FIG. 12. For example, the Kr of the first 20 MHz frequency subblock for BW80 can be expressed as Kr+Kshift=[−120:−2, 2:120]+[−380]=[−500:−382,−378:−260]. Similarly, for BW80, Kshift=−133 corresponding to the second 20 MHz frequency subblock, Kshift=132 corresponding to the third 20 MHz frequency subblock, and $K_{shift}$=379 corresponding to the fourth 20 MHz frequency subblock. FIG. 12 illustrates an example scenario 1200, in which Kr=[−120:−2, 2:120] for BW20, Kr=[−244:−3, 3:244] for BW40, and Kr=[−500:−16, 16:500] or Kr=[−500:−8, 8:500] for BW80.

In an alternative approach under the third proposed scheme, for dRU operations on a hybrid or puncture mode with dRU transmission on a frequency subblock of a wide bandwidth (e.g., 80 MHz or greater), the EHT-STF transmission tone range Kr may be defined for dRUs on each frequency subblock of the wide bandwidth by directly using rRU242, rRU484 or rRU996 on BW80, BW160 or BW320, respectively, as a transmission tone range Kr=rRU_i. The rRU may be a 242-tone, 484-tone or 996-tone regular RU for dRU on a 20 MHz, 40 MHz or 80 MHz subblock, respectively. Here, i denotes the frequency subblock index or rRU index on a wide bandwidth. Illustrative examples are provided in FIG. 13-FIG. 15.

FIG. 13 illustrates an example scenario 1300 of EHT-STF transmission of dRU over BW80. In scenario 1300, transmission tone range Kr=rRU242 or rRU484 or rRU996 for EHT-STF transmission with dRU on BW80 (or on 20 MHz or 40 MHz subblocks of BW80). That is, an EHT-STF may be transmitted with a dRU on a 20 MHz/40 MHz/80 MHz frequency subblock over an entire BW80.

For instance, for EHT-STF transmission with a dRU (e.g., a 26-tone, 52-tone or 106-tone dRU) on a 20 MHz subblock over BW80, the tone range of a regular 242-tone RU (rRU242) in one of four 20 MHz segments or subblocks of the BW80 may be utilized. In case the 20 MHz subblock is a first segment (denoted as "RU1" in FIG. 13) of the BW80, the transmission tone range Kr may be [−500:−259]. In case the 20 MHz subblock is a second segment (denoted as "RU2" in FIG. 13) of the BW80, the transmission tone range Kr may be [−253:−12]. In case the 20 MHz subblock is a third segment (denoted as "RU3" in FIG. 13) of the BW80, the transmission tone range Kr may be [12:253]. In case the 20 MHz subblock is a fourth segment (denoted as "RU4" in FIG. 13) of the BW80, the transmission tone range Kr may be [259:500].

Similarly, for EHT-STF transmission with a dRU (e.g., a 26-tone, 52-tone, 106-tone dRU or 242-tone dRU) on a 40 MHz subblock over BW80, the tone range of a regular 484-tone RU (rRU484) in one of two 40 MHz segments or subblocks of the BW80 may be utilized. In case the 40 MHz subblock is a first segment (denoted as "RU1" in FIG. 13) of the BW80, the transmission tone range Kr may be [−500:−259, −253:−12]. In case the 40 MHz subblock is a second segment (denoted as "RU2" in FIG. 13) of the BW80, the transmission tone range Kr may be [12:253, 259:500].

Likewise, for EHT-STF transmission with a dRU (e.g., a 26-tone, 52-tone, 106-tone dRU, 242-tone dRU or 484-tone dRU) over BW80, the tone range of a regular 996-tone RU (rRU996) of the BW80 may be utilized. In this case, for transmission in the 80 MHz segment (denoted as "RU1" in FIG. 13) of the BW80, the transmission tone range Kr may be [−500:−3, 3:500].

FIG. 14 illustrates an example scenario 1400 of EHT-STF transmission of dRU over BW160. In scenario 1400, transmission tone range Kr=rRU242 or rRU484 or rRU996 for EHT-STF transmission with dRU on 20 MHz, 40 MHz or 80 MHz subblocks of BW160. That is, an EHT-STF may be transmitted with a dRU on a 20 MHz/40 MHz/80 MHz frequency subblock over an entire BW160.

For instance, for EHT-STF transmission with a dRU (e.g., a 26-tone, 52-tone or 106-tone dRU) on a 20 MHz subblock over BW160, the tone range of a regular 242-tone RU (rRU242) in one of eight 20 MHz segments or subblocks of the BW160 may be utilized. In case the 20 MHz subblock is a first segment (denoted as "RU1" in FIG. 14) of the BW160, the transmission tone range Kr may be [−1012:−771]. In case the 20 MHz subblock is a second segment (denoted as "RU2" in FIG. 14) of the BW160, the transmission tone range Kr may be [−765:−524]. In case the 20 MHz subblock is a third segment (denoted as "RU3" in FIG. 14) of the BW160, the transmission tone range Kr may be [−500:−259]. In case the 20 MHz subblock is a fourth segment (denoted as "RU4" in FIG. 14) of the BW160, the transmission tone range Kr may be [−253:−12]. In case the 20 MHz subblock is a fifth segment (denoted as "RU5" in FIG. 14) of the BW160, the transmission tone range Kr may be [12:253]. In case the 20 MHz subblock is a sixth segment (denoted as "RU6" in FIG. 14) of the BW160, the transmission tone range Kr may be [259:500]. In case the 20 MHz subblock is a seventh segment (denoted as "RU7" in FIG. 14) of the BW160, the transmission tone range Kr may be [524:765]. In case the 20 MHz subblock is an eighth segment (denoted as "RU8" in FIG. 14) of the BW160, the transmission tone range Kr may be [771:1012].

Similarly, for EHT-STF transmission with a dRU (e.g., a 26-tone, 52-tone, 106-tone dRU or 242-tone dRU) on a 40 MHz subblock over BW160, the tone range of a regular 484-tone RU (rRU484) in one of four 40 MHz segments or subblocks of the BW160 may be utilized. In case the 40 MHz subblock is a first segment (denoted as "RU1" in FIG. 14) of the BW160, the transmission tone range Kr may be [−1012:−771, −765:−524]. In case the 40 MHz subblock is a second segment (denoted as "RU2" in FIG. 14) of the BW160, the transmission tone range Kr may be [−500:−259, −253:−12]. In case the 40 MHz subblock is a third segment (denoted as "RU3" in FIG. 14) of the BW160, the transmission tone range Kr may be [12:253, 259:500]. In case the 40 MHz subblock is a fourth segment (denoted as "RU4" in FIG. 14) of the BW160, the transmission tone range Kr may be [524:765, 771:1012].

Likewise, for EHT-STF transmission with a dRU (e.g., a 26-tone, 52-tone, 106-tone dRU, 242-tone dRU or 484-tone dRU) on an 80 MHz subblock over BW160, the tone range of a regular 996-tone RU (rRU996) in one of two 80 MHz segments or subblocks of the BW160 may be utilized. In case the 80 MHz subblock is a first segment (denoted as "RU1" in FIG. 14) of the BW160, the transmission tone range Kr may be [−1012:−515, −509:−12]. In case the 80 MHz subblock is a second segment (denoted as "RU2" in FIG. 14) of the BW160, the transmission tone range Kr may be [12:509, 515:1012].

Figure 15:
FIG. 15 is a diagram of an example scenario in accordance with an implementation of the present disclosure.

FIG. 15 illustrates an example scenario 1500 of EHT-STF transmission of dRU over BW320. In scenario 1500, transmission tone range Kr=rRU242 or rRU484 or rRU996 for EHT-STF transmission with dRU on 20 MHz, 40 MHz or 80 MHz subblocks of BW320. That is, an EHT-STF may be transmitted with a dRU on a 20 MHz/40 MHz/80 MHz frequency subblock over an entire BW320.

For instance, for EHT-STF transmission with a dRU (e.g., a 26-tone, 52-tone or 106-tone dRU) on a 20 MHz subblock over BW320, the tone range of a regular 242-tone RU (rRU242) in one of sixteen 20 MHz segments or subblocks of the BW320 may be utilized. In case the 20 MHz subblock is a first segment (denoted as "RU1" in FIG. 15) of the BW320, the transmission tone range Kr may be [−2036:−1795]. In case the 20 MHz subblock is a second segment (denoted as "RU2" in FIG. 15) of the BW320, the transmission tone range Kr may be [−1789:−1548]. In case the 20 MHz subblock is a third segment (denoted as "RU3" in FIG. 15) of the BW320, the transmission tone range Kr may be [−1524:−1283]. In case the 20 MHz subblock is a fourth segment (denoted as "RU4" in FIG. 15) of the BW320, the transmission tone range Kr may be [−1277:−1036]. In case the 20 MHz subblock is a fifth segment (denoted as "RU5" in FIG. 15) of the BW320, the transmission tone range Kr may be [−1012:−771]. In case the 20 MHz subblock is a sixth segment (denoted as "RU6" in FIG. 15) of the BW320, the transmission tone range Kr may be [−765:−524]. In case the 20 MHz subblock is a seventh segment (denoted as "RU7" in FIG. 15) of the BW320, the transmission tone range Kr may be [−500:−259]. In case the 20 MHz subblock is an eighth segment (denoted as "RU8" in FIG. 15) of the BW320, the transmission tone range Kr may be [−253:−12]. In case the 20 MHz subblock is a ninth segment (denoted as "RU9" in FIG. 15) of the BW320, the transmission tone range Kr may be [12:253]. In case the 20 MHz subblock is a tenth segment (denoted as "RU10" in FIG. 15) of the BW320, the transmission tone range Kr may be [259:500]. In case the 20 MHz subblock is an eleventh segment (denoted as "RU11" in FIG. 15) of the BW320, the transmission tone range Kr may be [524:765]. In case the 20 MHz subblock is a twelfth segment (denoted as "RU12" in FIG. 15) of the BW320, the transmission tone range Kr may be [771:1012]. In case the 20 MHz subblock is a thirteenth segment (denoted as "RU13" in FIG. 15) of the BW320, the transmission tone range Kr may be [1036:1277]. In case the 20 MHz subblock is a fourteenth segment (denoted as "RU14" in FIG. 15) of the BW320, the transmission tone range Kr may be [1283:1524]. In case the 20 MHz subblock is a fifteenth segment (denoted as "RU15" in FIG. 15) of the BW320, the transmission tone range Kr may be [1548:1789]. In case the 20 MHz subblock is a sixteenth segment (denoted as "RU16" in FIG. 15) of the BW320, the transmission tone range Kr may be [1795:2036].

Similarly, for EHT-STF transmission with a dRU (e.g., a 26-tone, 52-tone, 106-tone dRU or 242-tone dRU) on a 40 MHz subblock over BW320, the tone range of a regular 484-tone RU (rRU484) in one of eight 40 MHz segments or subblocks of the BW320 may be utilized. In case the 40 MHz subblock is a first segment (denoted as "RU1" in FIG. 15) of the BW320, the transmission tone range Kr may be [−2036:−1795, −1789:−1548]. In case the 40 MHz subblock is a second segment (denoted as "RU2" in FIG. 15) of the BW320, the transmission tone range Kr may be [−1524:−1283, −1277:−1036]. In case the 40 MHz subblock is a third segment (denoted as "RU3" in FIG. 15) of the BW320, the transmission tone range Kr may be [−1012:−771, −765:−524]. In case the 40 MHz subblock is a fourth segment (denoted as "RU4" in FIG. 15) of the BW320, the transmission tone range Kr may be [−500:−259, −253:−12]. In case the 40 MHz subblock is a fifth segment (denoted as "RU5" in FIG. 15) of the BW320, the transmission tone range Kr may be [12:253, 259:500]. In case the 40 MHz subblock is a sixth segment (denoted as "RU6" in FIG. 15) of the BW320, the transmission tone range Kr may be [524:765, 771:1012]. In case the 40 MHz subblock is a seventh segment (denoted as "RU7" in FIG. 15) of the BW320, the transmission tone range Kr may be [1036:1277, 1283:1524]. In case the 40 MHz subblock is an eighth segment (denoted as "RU8" in FIG. 15) of the BW320, the transmission tone range Kr may be [1548:1789, 1795:2036].

Likewise, for EHT-STF transmission with a dRU (e.g., a 26-tone, 52-tone, 106-tone dRU, 242-tone dRU or 484-tone dRU) on an 80 MHz subblock over BW320, the tone range of a regular 996-tone RU (rRU996) in one of four 80 MHz segments or subblocks of the BW320 may be utilized. In case the 80 MHz subblock is a first segment (denoted as "RU1" in FIG. 15) of the BW320, the transmission tone range Kr may be [−2036:−1539, −1533:−1036]. In case the 80 MHz subblock is a second segment (denoted as "RU2" in FIG. 15) of the BW320, the transmission tone range Kr may be [−1012:−515, −509:−12]. In case the 80 MHz subblock is a third segment (denoted as "RU3" in FIG. 15) of the BW320, the transmission tone range Kr may be [12:509, 515:1012]. In case the 80 MHz subblock is a fourth segment (denoted as "RU4" in FIG. 15) of the BW320, the transmission tone range Kr may be [1036:1533, 1539:2036].

Illustrative Implementations

Figure 16:
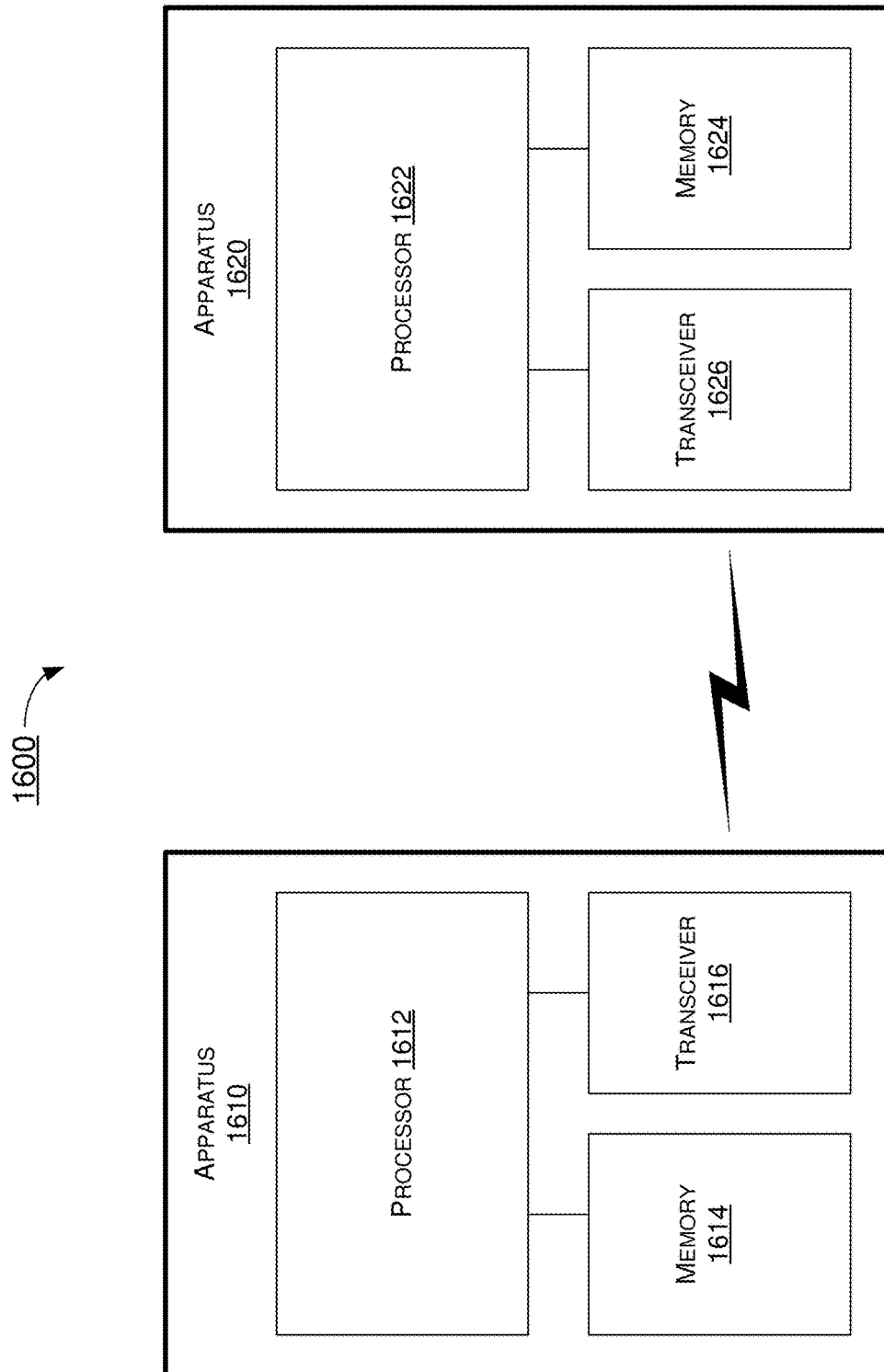
FIG. 16 is a block diagram of an example communication system in accordance with an implementation of the present disclosure.

FIG. 16 illustrates an example system 1600 having at least an example apparatus 1610 and an example apparatus 1620 in accordance with an implementation of the present disclosure. Each of apparatus 1610 and apparatus 1620 may perform various functions to implement schemes, techniques, processes and methods described herein pertaining to EHT-STF transmission for dRUs in 6 GHz LPI systems, including the various schemes described above with respect to various proposed designs, concepts, schemes, systems and methods described above as well as processes described below. For instance, apparatus 1610 may be an example implementation of communication entity 110, and apparatus 1620 may be an example implementation of communication entity 120.

Each of apparatus 1610 and apparatus 1620 may be a part of an electronic apparatus, which may be a STA or an AP, such as a portable or mobile apparatus, a wearable apparatus, a wireless communication apparatus or a computing apparatus. For instance, each of apparatus 1610 and apparatus 1620 may be implemented in a smartphone, a smart watch, a personal digital assistant, a digital camera, or a computing equipment such as a tablet computer, a laptop computer or a notebook computer. Each of apparatus 1610 and apparatus 1620 may also be a part of a machine type apparatus, which may be an IoT apparatus such as an immobile or a stationary apparatus, a home apparatus, a wire communication apparatus or a computing apparatus. For instance, each of apparatus 1610 and apparatus 1620 may be implemented in a smart thermostat, a smart fridge, a smart door lock, a wireless speaker or a home control center. When implemented in or as a network apparatus, apparatus 1610 and/or apparatus 1620 may be implemented in a network node, such as an AP in a WLAN.

In some implementations, each of apparatus 1610 and apparatus 1620 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1610 and apparatus 1620 may be implemented in or as a STA or an AP. Each of apparatus 1610 and apparatus 1620 may include at least some of those components shown in FIG. 16 such as a processor 1612 and a processor 1622, respectively, for example. Each of apparatus 1610 and apparatus 1620 may further include one or more other components not pertinent to the proposed scheme of the present disclosure (e.g., internal power supply, display device and/or user interface device), and, thus, such component(s) of apparatus 1610 and apparatus 1620 are neither shown in FIG. 16 nor described below in the interest of simplicity and brevity.

In one aspect, each of processor 1612 and processor 1622 may be implemented in the form of one or more single-core processors, one or more multi-core processors, one or more RISC processors or one or more CISC processors. That is, even though a singular term "a processor" is used herein to refer to processor 1612 and processor 1622, each of processor 1612 and processor 1622 may include multiple processors in some implementations and a single processor in other implementations in accordance with the present disclosure. In another aspect, each of processor 1612 and processor 1622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1612 and processor 1622 is a special-purpose machine specifically designed, arranged and configured to perform specific tasks including those pertaining to EHT-STF transmission for dRUs in 6 GHz LPI systems in accordance with various implementations of the present disclosure. For instance, each of processor 1612 and processor 1622 may be configured with hardware components, or circuitry, implementing one, some or all of the examples described and illustrated herein.

In some implementations, apparatus 1610 may also include a transceiver 1616 coupled to processor 1612. Transceiver 1616 may be capable of wirelessly transmitting and receiving data. In some implementations, apparatus 1620 may also include a transceiver 1626 coupled to processor 1622. Transceiver 1626 may include a transceiver capable of wirelessly transmitting and receiving data.

In some implementations, apparatus 1610 may further include a memory 1614 coupled to processor 1612 and capable of being accessed by processor 1612 and storing data therein. In some implementations, apparatus 1620 may further include a memory 1624 coupled to processor 1622 and capable of being accessed by processor 1622 and storing data therein. Each of memory 1614 and memory 1624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1614 and memory 1624 may include a type of read-only memory (ROM) such as mask ROM, programmable ROM (PROM), erasable programmable ROM (EPROM) and/or electrically erasable programmable ROM (EEPROM). Alternatively, or additionally, each of memory 1614 and memory 1624 may include a type of non-volatile random-access memory (NVRAM) such as flash memory, solid-state memory, ferroelectric RAM (FeRAM), magnetoresistive RAM (MRAM) and/or phase-change memory.

Each of apparatus 1610 and apparatus 1620 may be a communication entity capable of communicating with each other using various proposed schemes in accordance with the present disclosure. For illustrative purposes and without limitation, a description of capabilities of apparatus 1610, as communication entity 110, and apparatus 1620, as communication entity 120, is provided below. It is noteworthy that, although the example implementations described below are provided in the context of WLAN, the same may be implemented in other types of networks. Thus, although the following description of example implementations pertains to a scenario in which apparatus 1610 functions as a transmitting device and apparatus 1620 functions as a receiving device, the same is also applicable to another scenario in which apparatus 1610 functions as a receiving device and apparatus 1620 functions as a transmitting device.

Under a proposed scheme in accordance with the present disclosure with respect to EHT-STF transmission for dRUs in 6 GHz LPI systems, processor 1612 of apparatus 1610 may distribute subcarriers of a RU over an entire PPDU bandwidth or a frequency subblock (e.g., a 20 MHz, 40 MHz or 80 MHz frequency subblock) of a bandwidth (e.g., a wide bandwidth such as 80 MHz, 160 MHz or 320 MHz) to generate a dRU (e.g., a 26-tone dRU, a 52-tone dRU, a 106-tone dRU, a 242-tone dRU or a 484-tone dRU) associated with an EHT-STF of an UL TB PPDU. Moreover, processor 1612 may transmit, via transceiver 1616, the dRU associated with the EHT-STF in the entire PPDU bandwidth or a tone range of a rRU corresponding to the frequency subblock.

In some implementations, in transmitting the dRU, processor 1612 may perform a PPDU transmission with the dRU on a 20 MHz, 40 MHz, 80 MHz, 160 MHz or 320 MHz bandwidth using a frequency-domain sequence of the EHT-STF for a rRU on the 20 MHz, 40 MHz, 80 MHz, 160 MHz or 320 MHz bandwidth.

In some implementations, in an event that the dRU is transmitted in a 20 MHz distribution bandwidth, the tone range may include a subcarrier index range of [−120:−2, 2:120]. In such cases, the rRU may be a 242-tone rRU (rRU242) on BW20.

In some implementations: (1) responsive to the frequency subblock being a first 20 MHz frequency subblock of an 80 MHz bandwidth, the tone range may include a subcarrier index range of [−500:−259], (2) responsive to the frequency subblock being a second 20 MHz frequency subblock of the 80 MHz bandwidth, the tone range may include a subcarrier index range of [−253:−12], (3) responsive to the frequency subblock being a third 20 MHz frequency subblock of the 80 MHz bandwidth, the tone range may include a subcarrier index range of [12:253], and (4) responsive to the frequency subblock being a fourth 20 MHz frequency subblock of the 80 MHz bandwidth, the tone range may include a subcarrier index range of [259:500].

In some implementations: (1) responsive to the frequency subblock being a first 20 MHz frequency subblock of a 160 MHz bandwidth, the tone range may include a subcarrier index range of [−1012:−771], (2) responsive to the frequency subblock being a second 20 MHz frequency subblock of the 160 MHz bandwidth, the tone range may include a subcarrier index range of [−765:−524], (3) responsive to the frequency subblock being a third 20 MHz frequency subblock of the 160 MHz bandwidth, the tone range may include a subcarrier index range of [−500:−259], (4) responsive to the frequency subblock being a fourth 20 MHz frequency subblock of the 160 MHz bandwidth, the tone range may include a subcarrier index range of [−253:−12], (5) responsive to the frequency subblock being a fifth 20 MHz frequency subblock of the 160 MHz bandwidth, the tone range may include a subcarrier index range of [12:253], (6) responsive to the frequency subblock being a sixth 20 MHz frequency subblock of the 160 MHz bandwidth, the tone range may include a subcarrier index range of [259:500], (7) responsive to the frequency subblock being a seventh 20 MHz frequency subblock of the 160 MHz bandwidth, the tone range may include a subcarrier index range of [524:765], and (8) responsive to the frequency subblock being an eighth 20 MHz frequency subblock of the 160 MHz bandwidth, the tone range may include a subcarrier index range of [771:1012].

In some implementations: (1) responsive to the frequency subblock being a first 20 MHz frequency subblock of a 320 MHz bandwidth, the tone range may include a subcarrier index range of [−2036:−1795], (2) responsive to the frequency subblock being a second 20 MHz frequency subblock of the 320 MHz bandwidth, the tone range may include a subcarrier index range of [−1789:−1548], (3) responsive to the frequency subblock being a third 20 MHz frequency subblock of the 320 MHz bandwidth, the tone range may include a subcarrier index range of [−1524:−1283], (4) responsive to the frequency subblock being a fourth 20 MHz frequency subblock of the 320 MHz bandwidth, the tone range may include a subcarrier index range of [−1277:−1036], (5) responsive to the frequency subblock being a fifth 20 MHz frequency subblock of the 320 MHz bandwidth, the tone range may include a subcarrier index range of [−1012:−771], (6) responsive to the frequency subblock being a sixth 20 MHz frequency subblock of the 320 MHz bandwidth, the tone range may include a subcarrier index range of [−765:−524], (7) responsive to the frequency subblock being a seventh 20 MHz frequency subblock of the 320 MHz bandwidth, the tone range may include a subcarrier index range of [−500:−259], (8) responsive to the frequency subblock being an eighth 20 MHz frequency subblock of the 320 MHz bandwidth, the tone range may include a subcarrier index range of [−253:−12], (9) responsive to the frequency subblock being a ninth 20 MHz frequency subblock of the 320 MHz bandwidth, the tone range may include a subcarrier index range of [12:253], (10) responsive to the frequency subblock being a tenth 20 MHz frequency subblock of the 320 MHz bandwidth, the tone range may include a subcarrier index range of [259:500], (11) responsive to the frequency subblock being a eleventh 20 MHz frequency subblock of the 320 MHz bandwidth, the tone range may include a subcarrier index range of [524:765], (12) responsive to the frequency subblock being a twelfth 20 MHz frequency subblock of the 320 MHz bandwidth, the tone range may include a subcarrier index range of [771:1012], (13) responsive to the frequency subblock being a thirteenth 20 MHz frequency subblock of the 320 MHz bandwidth, the tone range may include a subcarrier index range of [1036:1277], (14) responsive to the frequency subblock being a fourteenth 20 MHz frequency subblock of the 320 MHz bandwidth, the tone range may include a subcarrier index range of [1283:1524], (15) responsive to the frequency subblock being a fifteenth 20 MHz frequency subblock of the 320 MHz bandwidth, the tone range may include a subcarrier index range of [1548:1789], and (16) responsive to the frequency subblock being an sixteenth 20 MHz frequency subblock of the 320 MHz bandwidth, the tone range may include a subcarrier index range of [1795:2036].

In some implementations, in an event that the dRU is transmitted in a 40 MHz distribution bandwidth, the tone range may include a subcarrier index range of [−244:−3, 3:244]. In such cases, the rRU may be a 484-tone rRU (rRU484) on BW40.

In some implementations: (1) responsive to the frequency subblock being a first 40 MHz frequency subblock of an 80 MHz bandwidth, the tone range may include a subcarrier index range of [−500:−259, −253:−12], and (2) responsive to the frequency subblock being a second 40 MHz frequency subblock of the 80 MHz bandwidth, the tone range may include a subcarrier index range of [12:253, 259:500].

In some implementations: (1) responsive to the frequency subblock being a first 40 MHz frequency subblock of a 160 MHz bandwidth, the tone range may include a subcarrier index range of [−1012:−771, −765:−524], (2) responsive to the frequency subblock being a second 40 MHz frequency subblock of the 160 MHz bandwidth, the tone range may include a subcarrier index range of [−500:−259, −253:−12], (3) responsive to the frequency subblock being a third 40 MHz frequency subblock of the 160 MHz bandwidth, the tone range may include a subcarrier index range of [12:253, 259:500], and (4) responsive to the frequency subblock being a fourth 40 MHz frequency subblock of the 160 MHz bandwidth, the tone range may include a subcarrier index range of [524:765, 771:1012].

In some implementations: (1) responsive to the frequency subblock being a first 40 MHz frequency subblock of a 320 MHz bandwidth, the tone range may include a subcarrier index range of [−2036:−1795, −1789:−1548], (2) responsive to the frequency subblock being a second 40 MHz frequency subblock of the 320 MHz bandwidth, the tone range may include a subcarrier index range of [−1524:−1283, −1277:−1036], (3) responsive to the frequency subblock being a third 40 MHz frequency subblock of the 320 MHz bandwidth, the tone range may include a subcarrier index range of [−1012:−771, −765:−524], (4) responsive to the frequency subblock being a fourth 40 MHz frequency subblock of the 320 MHz bandwidth, the tone range may include a subcarrier index range of [−500:−259, −253:−12], (5) responsive to the frequency subblock being a fifth 40 MHz frequency subblock of a 320 MHz bandwidth, the tone range may include a subcarrier index range of [12:253, 259:500], (6) responsive to the frequency subblock being a sixth 40 MHz frequency subblock of the 320 MHz bandwidth, the tone range may include a subcarrier index range of [524:765, 771:1012], (7) responsive to the frequency subblock being a seventh 40 MHz frequency subblock of the 320 MHz bandwidth, the tone range may include a subcarrier index range of [1036:1277, 1283:1524], and (8) responsive to the frequency subblock being an eighth 40 MHz frequency subblock of the 320 MHz bandwidth, the tone range may include a subcarrier index range of [1548:1789, 1795:2036].

In some implementations, in an event that the dRU is transmitted in an 80 MHz distribution bandwidth, the tone range may include a subcarrier index range of [−500:−3, 3:500]. In such cases, the rRU may be a 996-tone rRU (rRU996) on BW80.

In some implementations: (1) responsive to the frequency subblock being a first 80 MHz frequency subblock of a 160 MHz bandwidth, the tone range may include a subcarrier index range of [−1012:−515, −509:−12], and (2) responsive to the frequency subblock being a second 80 MHz frequency subblock of the 160 MHz bandwidth, the tone range may include a subcarrier index range of [12:509, 515:1012].

In some implementations: (1) responsive to the frequency subblock being a first 80 MHz frequency subblock of a 320 MHz bandwidth, the tone range may include a subcarrier index range of [−2036:−1539, −1533:−1036], (2) responsive to the frequency subblock being a second 80 MHz frequency subblock of the 320 MHz bandwidth, the tone range may include a subcarrier index range of [−1012:−515, −509:−12], (3) responsive to the frequency subblock being a third 80 MHz frequency subblock of the 320 MHz bandwidth, the tone range may include a subcarrier index range of [12:509, 515:1012], and (4) responsive to the frequency subblock being a fourth 80 MHz frequency subblock of the 320 MHz bandwidth, the tone range may include a subcarrier index range of [1036:1533, 1539:2036].

Illustrative Processes

FIG. 17 illustrates an example process 1700 in accordance with an implementation of the present disclosure. Process 1700 may represent an aspect of implementing various proposed designs, concepts, schemes, systems and methods described above. More specifically, process 1700 may represent an aspect of the proposed concepts and schemes pertaining to EHT-STF transmission for dRUs in 6 GHz LPI systems in accordance with the present disclosure. Process 1700 may include one or more operations, actions, or functions as illustrated by one or more of blocks 1710 and 1720. Although illustrated as discrete blocks, various blocks of process 1700 may be divided into additional blocks, combined into fewer blocks, or eliminated, depending on the desired implementation. Moreover, the blocks/sub-blocks of process 1700 may be executed in the order shown in FIG. 17 or, alternatively in a different order. Furthermore, one or more of the blocks/sub-blocks of process 1700 may be executed repeatedly or iteratively. Process 1700 may be implemented by or in apparatus 1610 and apparatus 1620 as well as any variations thereof. Solely for illustrative purposes and without limiting the scope, process 1700 is described below in the context of apparatus 1610 as communication entity 110 (e.g., a transmitting device whether a STA or an AP) and apparatus 1620 as communication entity 120 (e.g., a receiving device whether a STA or an AP) of a wireless network such as a WLAN in accordance with one or more of IEEE 802.11 standards. Process 1700 may begin at block 1710.

At 1710, process 1700 may involve processor 1612 of apparatus 1610 distributing subcarriers of a RU over a frequency subblock (e.g., a 20 MHz, 40 MHz or 80 MHz frequency subblock) of an entire PPDU bandwidth or a bandwidth (e.g., a wide bandwidth such as 80 MHz, 160 MHz or 320 MHz) to generate a dRU (e.g., a 26-tone dRU, a 52-tone dRU or a 106-tone dRU) associated with an EHT-STF of an UL TB PPDU. Process 1700 may proceed from 1710 to 1720.

At 1720, process 1700 may involve processor 1612 transmitting, via transceiver 1616, the dRU associated with the EHT-STF in the entire PPDU bandwidth or a tone range of a rRU corresponding to the frequency subblock.

In some implementations, in transmitting the dRU, process 1700 may involve processor 1612 performing a PPDU transmission with the dRU on a 20 MHz, 40 MHz, 80 MHz, 160 MHz or 320 MHz bandwidth using a frequency-domain sequence of the EHT-STF for a rRU on the 20 MHz, 40 MHz, 80 MHz, 160 MHz or 320 MHz bandwidth.

In some implementations, in an event that the dRU is transmitted in a 20 MHz distribution bandwidth, the tone range may include a subcarrier index range of [−120:−2, 2:120]. In such cases, the rRU may be a 242-tone rRU (rRU242).

In some implementations: (1) responsive to the frequency subblock being a first 20 MHz frequency subblock of an 80 MHz bandwidth, the tone range may include a subcarrier index range of [−500:−259], (2) responsive to the frequency subblock being a second 20 MHz frequency subblock of the 80 MHz bandwidth, the tone range may include a subcarrier index range of [−253:−12], (3) responsive to the frequency subblock being a third 20 MHz frequency subblock of the 80 MHz bandwidth, the tone range may include a subcarrier index range of [12:253], and (4) responsive to the frequency subblock being a fourth 20 MHz frequency subblock of the 80 MHz bandwidth, the tone range may include a subcarrier index range of [259:500].

In some implementations: (1) responsive to the frequency subblock being a first 20 MHz frequency subblock of a 160 MHz bandwidth, the tone range may include a subcarrier index range of [−1012:−771], (2) responsive to the frequency subblock being a second 20 MHz frequency subblock of the 160 MHz bandwidth, the tone range may include a subcarrier index range of [−765:−524], (3) responsive to the frequency subblock being a third 20 MHz frequency subblock of the 160 MHz bandwidth, the tone range may include a subcarrier index range of [−500:−259], (4) responsive to the frequency subblock being a fourth 20 MHz frequency subblock of the 160 MHz bandwidth, the tone range may include a subcarrier index range of [−253:−12], (5) responsive to the frequency subblock being a fifth 20 MHz frequency subblock of the 160 MHz bandwidth, the tone range may include a subcarrier index range of [12:253], (6) responsive to the frequency subblock being a sixth 20 MHz frequency subblock of the 160 MHz bandwidth, the tone range may include a subcarrier index range of [259:500], (7) responsive to the frequency subblock being a seventh 20 MHz frequency subblock of the 160 MHz bandwidth, the tone range may include a subcarrier index range of [524:765], and (8) responsive to the frequency subblock being an eighth 20 MHz frequency subblock of the 160 MHz bandwidth, the tone range may include a subcarrier index range of [771:1012].

In some implementations: (1) responsive to the frequency subblock being a first 20 MHz frequency subblock of a 320 MHz bandwidth, the tone range may include a subcarrier index range of [−2036:−1795], (2) responsive to the frequency subblock being a second 20 MHz frequency subblock of the 320 MHz bandwidth, the tone range may include a subcarrier index range of [−1789:−1548], (3) responsive to the frequency subblock being a third 20 MHz frequency subblock of the 320 MHz bandwidth, the tone range may include a subcarrier index range of [−1524:−1283], (4) responsive to the frequency subblock being a fourth 20 MHz frequency subblock of the 320 MHz bandwidth, the tone range may include a subcarrier index range of [−1277:−1036], (5) responsive to the frequency subblock being a fifth 20 MHz frequency subblock of the 320 MHz bandwidth, the tone range may include a subcarrier index range of [−1012:−771], (6) responsive to the frequency subblock being a sixth 20 MHz frequency subblock of the 320 MHz bandwidth, the tone range may include a subcarrier index range of [−765:−524], (7) responsive to the frequency subblock being a seventh 20 MHz frequency subblock of the 320 MHz bandwidth, the tone range may include a subcarrier index range of [−500:−259], (8) responsive to the frequency subblock being an eighth 20 MHz frequency subblock of the 320 MHz bandwidth, the tone range may include a subcarrier index range of [−253:−12], (9) responsive to the frequency subblock being a ninth 20 MHz frequency subblock of the 320 MHz bandwidth, the tone range may include a subcarrier index range of [12:253], (10) responsive to the frequency subblock being a tenth 20 MHz frequency subblock of the 320 MHz bandwidth, the tone range may include a subcarrier index range of [259:500], (11) responsive to the frequency subblock being a eleventh 20 MHz frequency subblock of the 320 MHz bandwidth, the tone range may include a subcarrier index range of [524:765], (12) responsive to the frequency subblock being a twelfth 20 MHz frequency subblock of the 320 MHz bandwidth, the tone range may include a subcarrier index range of [771:1012], (13) responsive to the frequency subblock being a thirteenth 20 MHz frequency subblock of the 320 MHz bandwidth, the tone range may include a subcarrier index range of [1036:1277], (14) responsive to the frequency subblock being a fourteenth 20 MHz frequency subblock of the 320 MHz bandwidth, the tone range may include a subcarrier index range of [1283:1524], (15) responsive to the frequency subblock being a fifteenth 20 MHz frequency subblock of the 320 MHz bandwidth, the tone range may include a subcarrier index range of [1548:1789], and (16) responsive to the frequency subblock being an sixteenth 20 MHz frequency subblock of the 320 MHz bandwidth, the tone range may include a subcarrier index range of [1795:2036].

In some implementations, in an event that the dRU is transmitted in a 40 MHz distribution bandwidth, the tone range may include a subcarrier index range of [−244:−3, 3:244]. In such cases, the rRU may be a 484-tone rRU (rRU484).

In some implementations: (1) responsive to the frequency subblock being a first 40 MHz frequency subblock of an 80 MHz bandwidth, the tone range may include a subcarrier index range of [−500:−259, −253:−12], and (2) responsive to the frequency subblock being a second 40 MHz frequency subblock of the 80 MHz bandwidth, the tone range may include a subcarrier index range of [12:253, 259:500].

In some implementations: (1) responsive to the frequency subblock being a first 40 MHz frequency subblock of a 160 MHz bandwidth, the tone range may include a subcarrier index range of [−1012:−771, −765:−524], (2) responsive to the frequency subblock being a second 40 MHz frequency subblock of the 160 MHz bandwidth, the tone range may include a subcarrier index range of [−500:−259, −253:−12], (3) responsive to the frequency subblock being a third 40 MHz frequency subblock of the 160 MHz bandwidth, the tone range may include a subcarrier index range of [12:253, 259:500], and (4) responsive to the frequency subblock being a fourth 40 MHz frequency subblock of the 160 MHz bandwidth, the tone range may include a subcarrier index range of [524:765, 771:1012].

In some implementations: (1) responsive to the frequency subblock being a first 40 MHz frequency subblock of a 320 MHz bandwidth, the tone range may include a subcarrier index range of [−2036:−1795, −1789:−1548], (2) responsive to the frequency subblock being a second 40 MHz frequency subblock of the 320 MHz bandwidth, the tone range may include a subcarrier index range of [−1524:−1283, −1277:−1036], (3) responsive to the frequency subblock being a third 40 MHz frequency subblock of the 320 MHz bandwidth, the tone range may include a subcarrier index range of [−1012:−771, −765:−524], (4) responsive to the frequency subblock being a fourth 40 MHz frequency subblock of the 320 MHz bandwidth, the tone range may include a subcarrier index range of [−500:−259, −253:−12], (5) responsive to the frequency subblock being a fifth 40 MHz frequency subblock of a 320 MHz bandwidth, the tone range may include a subcarrier index range of [12:253, 259:500], (6) responsive to the frequency subblock being a sixth 40 MHz frequency subblock of the 320 MHz bandwidth, the tone range may include a subcarrier index range of [524:765, 771:1012], (7) responsive to the frequency subblock being a seventh 40 MHz frequency subblock of the 320 MHz bandwidth, the tone range may include a subcarrier index range of [1036:1277, 1283:1524], and (8) responsive to the frequency subblock being an eighth 40 MHz frequency subblock of the 320 MHz bandwidth, the tone range may include a subcarrier index range of [1548:1789, 1795:2036].

In some implementations, in an event that the dRU is transmitted in an 80 MHz distribution bandwidth, the tone range may include a subcarrier index range of [−500:−3, 3:500]. In such cases, the rRU may be a 996-tone rRU (rRU996).

In some implementations: (1) responsive to the frequency subblock being a first 80 MHz frequency subblock of a 160 MHz bandwidth, the tone range may include a subcarrier index range of [−1012:−515, −509:−12], and (2) responsive to the frequency subblock being a second 80 MHz frequency subblock of the 160 MHz bandwidth, the tone range may include a subcarrier index range of [12:509, 515:1012].

In some implementations: (1) responsive to the frequency subblock being a first 80 MHz frequency subblock of a 320 MHz bandwidth, the tone range may include a subcarrier index range of [−2036:−1539, −1533:−1036], (2) responsive to the frequency subblock being a second 80 MHz frequency subblock of the 320 MHz bandwidth, the tone range may include a subcarrier index range of [−1012:−515, −509:−12], (3) responsive to the frequency subblock being a third 80 MHz frequency subblock of the 320 MHz bandwidth, the tone range may include a subcarrier index range of [12:509, 515:1012], and (4) responsive to the frequency subblock being a fourth 80 MHz frequency subblock of the 320 MHz bandwidth, the tone range may include a subcarrier index range of [1036:1533, 1539:2036].

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

distributing subcarriers of a resource unit (RU) over an entire physical-layer protocol data unit (PPDU) bandwidth or a frequency subblock of a bandwidth to generate a distributed-tone RU (dRU) associated with an extremely-high-throughput short training field (EHT-STF) of an uplink (UL) trigger-based (TB) PPDU; and transmitting the dRU associated with the EHT-STF in the entire PPDU bandwidth or a tone range of a regular RU (rRU) corresponding to the frequency subblock, wherein:

responsive to the frequency subblock being a first 20 MHz frequency subblock of a 160 MHz bandwidth, the tone range comprises a subcarrier index range of [−1012:−771], responsive to the frequency subblock being a second 20 MHz frequency subblock of the 160 MHz bandwidth, the tone range comprises a subcarrier index range of [−765:−524], responsive to the frequency subblock being a third 20 MHz frequency subblock of the 160 MHz bandwidth, the tone range comprises a subcarrier index range of [−500:−259], responsive to the frequency subblock being a fourth 20 MHz frequency subblock of the 160 MHz bandwidth, the tone range comprises a subcarrier index range of [−253:−12], responsive to the frequency subblock being a fifth 20 MHz frequency subblock of the 160 MHz bandwidth, the tone range comprises a subcarrier index range of [12:253], responsive to the frequency subblock being a sixth 20 MHz frequency subblock of the 160 MHz bandwidth, the tone range comprises a subcarrier index range of [259:500], responsive to the frequency subblock being a seventh 20 MHz frequency subblock of the 160 MHz bandwidth, the tone range comprises a subcarrier index range of [524:765], responsive to the frequency subblock being an eighth 20 MHz frequency subblock of the 160 MHz bandwidth, the tone range comprises a subcarrier index range of [771:1012], responsive to the frequency subblock being a first 20 MHz frequency subblock of a 320 MHz bandwidth, the tone range comprises a subcarrier index range of [−2036:−1795], responsive to the frequency subblock being a second 20 MHz frequency subblock of the 320 MHz bandwidth, the tone range comprises a subcarrier index range of [−1789:−1548], responsive to the frequency subblock being a third 20 MHz frequency subblock of the 320 MHz bandwidth, the tone range comprises a subcarrier index range of [−1524:−1283], responsive to the frequency subblock being a fourth 20 MHz frequency subblock of the 320 MHz bandwidth, the tone range comprises a subcarrier index range of [−1277:−1036], responsive to the frequency subblock being a fifth 20 MHz frequency subblock of the 320 MHz bandwidth, the tone range comprises a subcarrier index range of [−1012:−771], responsive to the frequency subblock being a sixth 20 MHz frequency subblock of the 320 MHz bandwidth, the tone range comprises a subcarrier index range of [−765:−524], responsive to the frequency subblock being a seventh 20 MHz frequency subblock of the 320 MHz bandwidth, the tone range comprises a subcarrier index range of [−500:−259], responsive to the frequency subblock being an eighth 20 MHz frequency subblock of the 320 MHz bandwidth, the tone range comprises a subcarrier index range of [−253:−12], responsive to the frequency subblock being a ninth 20 MHz frequency subblock of the 320 MHz bandwidth, the tone range comprises a subcarrier index range of [12:253], responsive to the frequency subblock being a tenth 20 MHz frequency subblock of the 320 MHz bandwidth, the tone range comprises a subcarrier index range of [259:500], responsive to the frequency subblock being a eleventh 20 MHz frequency subblock of the 320 MHz bandwidth, the tone range comprises a subcarrier index range of [524:765], responsive to the frequency subblock being a twelfth 20 MHz frequency subblock of the 320 MHz bandwidth, the tone range comprises a subcarrier index range of [771:1012], responsive to the frequency subblock being a thirteenth 20 MHz frequency subblock of the 320 MHz bandwidth, the tone range comprises a subcarrier index range of [1036:1277], responsive to the frequency subblock being a fourteenth 20 MHz frequency subblock of the 320 MHz bandwidth, the tone range comprises a subcarrier index range of [1283:1524], responsive to the frequency subblock being a fifteenth 20 MHz frequency subblock of the 320 MHz bandwidth, the tone range comprises a subcarrier index range of [1548:1789], and responsive to the frequency subblock being an sixteenth 20 MHz frequency subblock of the 320 MHz bandwidth, the tone range comprises a subcarrier index range of [1795:2036].

2. The method of claim 1, wherein the transmitting of the dRU comprises performing a PPDU transmission with the dRU on a 20 MHz, 40 MHz, 80 MHz, 160 MHz or 320 MHz bandwidth using a frequency-domain sequence of the EHT-STF for a regular RU (rRU) on the 20 MHz, 40 MHz, 80 MHz, 160 MHz or 320 MHz bandwidth.

3. The method of claim 1, wherein, in an event that the dRU is transmitted in a 20 MHz distribution bandwidth, the tone range comprises a subcarrier index range of [−120:−2, 2:120].

4. The method of claim 3, wherein the rRU comprises a 242-tone rRU (rRU242).

5. The method of claim 1, wherein:
responsive to the frequency subblock being a first 20 MHz frequency subblock of an 80 MHz bandwidth, the tone range comprises a subcarrier index range of [−500:−259], responsive to the frequency subblock being a second 20 MHz frequency subblock of the 80 MHz bandwidth, the tone range comprises a subcarrier index range of [−253: −12], responsive to the frequency subblock being a third 20 MHz frequency subblock of the 80 MHz bandwidth, the tone range comprises a subcarrier index range of [12:253], and responsive to the frequency subblock being a fourth 20 MHz frequency subblock of the 80 MHz bandwidth, the tone range comprises a subcarrier index range of [259:500].

6. The method of claim 1, wherein, in an event that the dRU is transmitted in a 40 MHz distribution bandwidth, the tone range comprises a subcarrier index range of [−244:−3, 3:244].

7. The method of claim 6, wherein the rRU comprises a 484-tone rRU (rRU484).

8. The method of claim 1, wherein:
responsive to the frequency subblock being a first 40 MHz frequency subblock of an 80 MHz bandwidth, the tone range comprises a subcarrier index range of [−500:−259, −253:−12], and responsive to the frequency subblock being a second 40 MHz frequency subblock of the 80 MHz bandwidth, the tone range comprises a subcarrier index range of [12:253, 259:500].

9. The method of claim 1, wherein:
responsive to the frequency subblock being a first 40 MHz frequency subblock of a 160 MHz bandwidth, the tone range comprises a subcarrier index range of [−1012:−771, −765:−524], responsive to the frequency subblock being a second 40 MHz frequency subblock of the 160 MHz bandwidth, the tone range comprises a subcarrier index range of [−500:−259,−253:−12], responsive to the frequency subblock being a third 40 MHz frequency subblock of the 160 MHz bandwidth, the tone range comprises a subcarrier index range of [12:253, 259:500], and responsive to the frequency subblock being a fourth 40 MHz frequency subblock of the 160 MHz bandwidth, the tone range comprises a subcarrier index range of [524:765, 771:1012].

10. The method of claim 1, wherein:
responsive to the frequency subblock being a first 40 MHz frequency subblock of a 320 MHz bandwidth, the tone range comprises a subcarrier index range of [−2036:−1795, −1789:−1548], responsive to the frequency subblock being a second 40 MHz frequency subblock of the 320 MHz bandwidth, the tone range comprises a subcarrier index range of [−1524:−1283,−1277:−1036], responsive to the frequency subblock being a third 40 MHz frequency subblock of the 320 MHz bandwidth, the tone range comprises a subcarrier index range of [−1012:−771,−765:−524], responsive to the frequency subblock being a fourth 40 MHz frequency subblock of the 320 MHz bandwidth, the tone range comprises a subcarrier index range of [−500:−259, −253:−12], responsive to the frequency subblock being a fifth 40 MHz frequency subblock of a 320 MHz bandwidth, the tone range comprises a subcarrier index range of [12:253, 259:500], responsive to the frequency subblock being a sixth 40 MHz frequency subblock of the 320 MHz bandwidth, the tone range comprises a subcarrier index range of [524:765, 771:1012], responsive to the frequency subblock being a seventh 40 MHz frequency subblock of the 320 MHz bandwidth, the tone range comprises a subcarrier index range of [1036:1277, 1283:1524], and responsive to the frequency subblock being an eighth 40 MHz frequency subblock of the 320 MHz bandwidth, the tone range comprises a subcarrier index range of [1548:1789, 1795:2036].

11. The method of claim 1, wherein, in an event that the dRU is transmitted in an 80 MHz distribution bandwidth, the tone range comprises a subcarrier index range of [−500:−3, 3:500].

12. The method of claim 11, wherein the rRU comprises a 996-tone rRU (rRU996).

13. The method of claim 1, wherein:
responsive to the frequency subblock being a first 80 MHz frequency subblock of a 160 MHz bandwidth, the tone range comprises a subcarrier index range of [−1012:−515, −509:−12], and
responsive to the frequency subblock being a second 80 MHz frequency subblock of the 160 MHz bandwidth, the tone range comprises a subcarrier index range of [12:509, 515:1012].

14. The method of claim 1, wherein:
responsive to the frequency subblock being a first 80 MHz frequency subblock of a 320 MHz bandwidth, the tone range comprises a subcarrier index range of [−2036:−1539, −1533:−1036],
responsive to the frequency subblock being a second 80 MHz frequency subblock of the 320 MHz bandwidth, the tone range comprises a subcarrier index range of [−1012:−515,−509:−12],
responsive to the frequency subblock being a third 80 MHz frequency subblock of the 320 MHz bandwidth, the tone range comprises a subcarrier index range of [12:509, 515:1012], and
responsive to the frequency subblock being a fourth 80 MHz frequency subblock of the 320 MHz bandwidth, the tone range comprises a subcarrier index range of [1036:1533, 1539:2036].

15. The method of claim 1, wherein the dRU comprises a 26-tone dRU, a 52-tone dRU, a 106-tone dRU, a 242-tone dRU or a 484-tone dRU.

16. An apparatus, comprising:
a transceiver configured to transmit and receive wirelessly; and
a processor coupled to the transceiver and configured to perform operations comprising:
distributing subcarriers of a resource unit (RU) over an entire physical-layer protocol data unit (PPDU) bandwidth or a frequency subblock of a bandwidth to generate a distributed-tone RU (dRU) associated with an extremely-high-throughput short training field (EHT-STF) of an uplink (UL) trigger-based (TB) PPDU; and
transmitting, via the transceiver, the dRU associated with the EHT-STF in the entire PPDU bandwidth or a tone range of a regular RU (rRU) corresponding to the frequency subblock, wherein:
responsive to the frequency subblock being a first 20 MHz frequency subblock of a 160 MHz bandwidth, the tone range comprises a subcarrier index range of [−1012:−771],
responsive to the frequency subblock being a second 20 MHz frequency subblock of the 160 MHz bandwidth, the tone range comprises a subcarrier index range of [−765:−524],
responsive to the frequency subblock being a third 20 MHz frequency subblock of the 160 MHz bandwidth, the tone range comprises a subcarrier index range of [−500:−259],
responsive to the frequency subblock being a fourth 20 MHz frequency subblock of the 160 MHz bandwidth, the tone range comprises a subcarrier index range of [−253:−12],
responsive to the frequency subblock being a fifth 20 MHz frequency subblock of the 160 MHz bandwidth, the tone range comprises a subcarrier index range of [12:253],
responsive to the frequency subblock being a sixth 20 MHz frequency subblock of the 160 MHz bandwidth, the tone range comprises a subcarrier index range of [259:500],
responsive to the frequency subblock being a seventh 20 MHz frequency subblock of the 160 MHz bandwidth, the tone range comprises a subcarrier index range of [524:765],
responsive to the frequency subblock being an eighth 20 MHz frequency subblock of the 160 MHz bandwidth, the tone range comprises a subcarrier index range of [771:1012],
responsive to the frequency subblock being a first 20 MHz frequency subblock of a 320 MHz bandwidth, the tone range comprises a subcarrier index range of [−2036:−1795],
responsive to the frequency subblock being a second 20 MHz frequency subblock of the 320 MHz bandwidth, the tone range comprises a subcarrier index range of [−1789:−1548],
responsive to the frequency subblock being a third 20 MHz frequency subblock of the 320 MHz bandwidth, the tone range comprises a subcarrier index range of [−1524:−1283],
responsive to the frequency subblock being a fourth 20 MHz frequency subblock of the 320 MHz bandwidth, the tone range comprises a subcarrier index range of [−1277:−1036],
responsive to the frequency subblock being a fifth 20 MHz frequency subblock of the 320 MHz bandwidth, the tone range comprises a subcarrier index range of [−1012:−771],
responsive to the frequency subblock being a sixth 20 MHz frequency subblock of the 320 MHz bandwidth, the tone range comprises a subcarrier index range of [−765:−524],
responsive to the frequency subblock being a seventh 20 MHz frequency subblock of the 320 MHz bandwidth, the tone range comprises a subcarrier index range of [−500:−259],
responsive to the frequency subblock being an eighth 20 MHz frequency subblock of the 320 MHz bandwidth, the tone range comprises a subcarrier index range of [−253:−12], responsive to the frequency subblock being a ninth 20 MHz frequency subblock of the 320 MHz bandwidth, the tone range comprises a subcarrier index range of [12:253], responsive to the frequency subblock being a tenth 20 MHz frequency subblock of the 320 MHz bandwidth, the tone range comprises a subcarrier index range of [259:500], responsive to the frequency subblock being a eleventh 20 MHz frequency subblock of the 320 MHz bandwidth, the tone range comprises a subcarrier index range of [524:765], responsive to the frequency subblock being a twelfth 20 MHz frequency subblock of the 320 MHz bandwidth, the tone range comprises a subcarrier index range of [771:1012], responsive to the frequency subblock being a thirteenth 20 MHz frequency subblock of the 320 MHz bandwidth, the tone range comprises a subcarrier index range of [1036:1277], responsive to the frequency subblock being a fourteenth 20 MHz frequency subblock of the 320 MHz bandwidth, the tone range comprises a subcarrier index range of [1283:1524], responsive to the frequency subblock being a fifteenth 20 MHz frequency subblock of the 320 MHz bandwidth, the tone range comprises a subcarrier index range of [1548:1789], and responsive to the frequency subblock being an sixteenth 20 MHz frequency subblock of the 320 MHz bandwidth, the tone range comprises a subcarrier index range of [1795:2036].

17. The apparatus of claim 16, wherein, in transmitting the dRU, the processor is configured to perform a PPDU transmission with the dRU on a 20 MHz, 40 MHz, 80 MHz, 160 MHz or 320 MHz bandwidth using a frequency-domain sequence of the EHT-STF for a regular RU (rRU) on the 20 MHz, 40 MHZ, 80 MHZ, 160 MHz or 320 MHz bandwidth.

18. The apparatus of claim 16, wherein:

in an event that the dRU is transmitted in a 20 MHz distribution bandwidth, the tone range comprises a subcarrier index range of [−120:−2, 2:120] which is equivalent to a 242-tone rRU (rRU242);

in an event that the dRU is transmitted in a 40 MHz distribution bandwidth, the tone range comprises a subcarrier index range of [−244:−3, 3:244] which is equivalent to a 484-tone rRU (rRU484); and in an event that the dRU is transmitted in an 80 MHz distribution bandwidth, the tone range comprises a subcarrier index range of [−500:−3, 3:500] which is equivalent to a 996-tone rRU (rRU996).

* * * * *